(12) United States Patent
Lee et al.

(10) Patent No.: US 7,026,365 B2
(45) Date of Patent: Apr. 11, 2006

(54) POLYMER NANOCOMPOSITE FOAMS

(75) Inventors: L. James Lee, Columbus, OH (US);
Kurt W. Koelling, Columbus, OH (US); David L. Tomasko, Columbus, OH (US); Xiangmin Han, Columbus, OH (US); Changchun Zeng, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 67 days.

(21) Appl. No.: 10/849,599

(22) Filed: May 20, 2004

(65) Prior Publication Data
US 2005/0004243 A1 Jan. 6, 2005

Related U.S. Application Data

(62) Division of application No. 10/137,037, filed on May 2, 2002, now Pat. No. 6,759,446.

(51) Int. Cl.
*C08J 9/35* (2006.01)
(52) U.S. Cl. .............................. 521/83; 521/91; 521/92; 521/93; 521/100; 521/110
(58) Field of Classification Search .................. 521/83, 521/91, 92, 93, 100, 110
See application file for complete search history.

(56) References Cited

U.S. PATENT DOCUMENTS

| 5,076,959 A | * | 12/1991 | Barker et al. ........... 252/182.13 |
| 5,302,634 A | | 4/1994 | Mushovic .................... 523/219 |
| 5,369,147 A | | 11/1994 | Mushovic .................... 523/219 |
| 5,650,106 A | | 7/1997 | Paquet et al. .................. 264/53 |
| 5,866,053 A | | 2/1999 | Park et al. ..................... 264/50 |
| 6,069,183 A | | 5/2000 | Wilkes et al. ................ 521/139 |
| 6,583,188 B1 | | 6/2003 | Chaudhary et al. ........... 521/60 |

OTHER PUBLICATIONS

Alexandre, M. et al., Polymer-layered silicate nanocomposites: preparation, properties and uses of a new class of materials, *Materials Science and Engineering*, 28, 1 (2000).
Klempner, D. et al., eds. *Handbook of Polymeric Foams and Foam Technology*; Oxford University Press: Munich; Vienna; New York (1991).
Zeng, C. et al., Poly(methyl Methacrylate) and Polystyrene/Clay Nanocomposites Prepared by in-Situ Polymerization, *Macromolecules*, 34(12), 4098 (2001).
Han, X. et al., Processing and Cell Structure of Nano-Clay Modified Microcellular Foams, *Annu. Tech. Conf.—Soc. Plast. Eng.*, (2002).
Vaia, R. et al., Lattice Model of Polymer Melt Intercalation in Organically-Modified Layered Silicates, *Marcomolecules*, 30, 7990 (1997).

Vaia, R. et al., Polymer Melt Intercalation in Organically-Modified Layered Silicates: Model Predictions and Experiment, *Marcomolecules*, 30, 8000 (1997).
Krishnamoorti, R. et al., Shear Response of Layered Silicate Nanocomposites, *J. Chem. Phys.*, 114(11), 4968 (2001).
Okamoto, M. et al., A House of Cards Structure in Polypropylene/Clay Nanocomposites Under Elongational Flow, Nano Letters, 1 (6), 295-298 (2001).
Nam, P. et al., Foam Processing and Cellular Structure of PP/Clay Nanocomposites, *Proceeding of the First World Conference on Nanocomposites*, Chicago, IL (2001).
Cooper, A., Polymer Synthesis and Processing Using Supercritical Carbon Dioxide, *J. Mater. Chem.*, 10 (2), 207 (2000).
Han, X. et al., Influences of Solubility and Viscosity in the Polystyrene/CO2 Microcellular Foaming Extrusion, *Annu. Tech. Conf.—Soc. Plast. Eng.*, 58th (vol. 2), 2 1857 (2000).
Han, X., et al., Extrusion of Polystyrene Microcellular Foam with Supercritical CO2, *Annu. Tech. Conf.—Soc. Plast. Eng.*, 2 1741 (2001).
Zeng, C. et al., Structure of Nanocomposite Foams, *Antec*, 1504-1508 (2002).
Lee, L. et al., *Polymer Nanocomposite Foams by Using Supercritical $CO_2$*, unpublished.
Lee, L. et al., *Polymer Nanocomposite Foams Prepared by Supercritical Fluid Foaming Technology*, unpublished.
Han, X. et al., *Processing and Cell Structure of Nano-Clay Modified Microcellular Foams*, unpublished.
Han, X. et al., Process Optimization in Microcellular Foam Extrusion, Antec, 1741-1745 (2001).

(Continued)

*Primary Examiner*—James J. Seidleck
*Assistant Examiner*—Irina S. Zemel
(74) *Attorney, Agent, or Firm*—Standley Law Group LLP

(57) ABSTRACT

Nano-sized particles such as nano-clays can be mixed with polymers through either melt compounding or in-situ polymerization. By modifying the particle surface with various surfactants and controlling processing conditions, we are able to achieve either intercalated (partial dispersion) or exfoliated (full dispersion) nano-clay distribution in polymers with the clay content up to 35% by weight. When a blowing agent is injected into the nanocomposite in an extruder (a continuous mixer) or a batch mixer, polymeric foam can be produced. Supercritical carbon dioxide, an environmentally friendly, low-cost, non-flammable, chemically benign gas is used as the blowing agent. This process forms a microcellular foam with very high cell density ($>10^9$ cells/cc) and small cell size (<5 microns) can be achieved by controlling the $CO_2$ content, melt and die temperature, and pressure drop rate.

60 Claims, 26 Drawing Sheets

OTHER PUBLICATIONS

Polymer Nanocomposite Foams by Using Supercritical $CO_2$ (unpublished) by L.J. Lee, K.W. Koelling, D.L. Tomasko, X. Han, and C. Zeng.

Structure of Nanocomposite Foams (unpublished) by L.J. Lee, K.W. Koelling, D.L. Tomasko, X. Han, and C. Zeng.

Polymer Nanocomposite Foams Prepared by Supercritical Fluid Foaming Technology (unpublished) by L.J. Lee, K.W. Koelling, D.L. Tomasko, X. Han, and C. Zeng.

Processing and Cell Structure of Nano-Clay Modified Microcellular Foams (unpublished) L.J. Lee, K.W. Koelling, D.L. Tomasko, X. Han, and C. Zeng.

Poly(methyl methacrylate) and Polystyrene/Clay Nanocomposites Prepared by in-Situ Polymerization, Macromolecules 2001, 34, 4098-4103 by Chngchun Zeng and L. James Lee.

* cited by examiner

POLYMER NANOCOMPOSITE FOAMS

The present application is a divisional application of U.S. patent application Ser. No. 10/137,037, filed May 2, 2002, now U.S. Pat. No. 6,759,446, which is hereby incorporated by reference in its entirety herein.

TECHNICAL FIELD OF THE INVENTION

The present invention is in the field of polymer foams. Specifically, the present invention relates to polymer nanocomposite foams.

BACKGROUND OF THE INVENTION

The present invention hereby incorporates by reference, application Ser. No. 10/425,565, entitled "Clay Nanocomposites Prepared by In-situ Polymerization", filed on Apr. 29, 2002.

Foamed polymers are found in applications ranging from packaging, insulation, cushions, adsorbents, to scaffolds for tissue engineering. The basic principle of foaming is to mix a blowing agent (typically a gas) into a polymer melt and induce a thermodynamic instability through a temperature or pressure change to nucleate bubbles of the blowing agent.

In this invention, supercritical $CO_2$ (the critical temperature $T_c$: 31° C. and the critical pressure $P_c$: 73.8 bar or 1074 psi), a potential replacement of the traditional foaming agents (hydrocarbon or chlorofluorocarbon), was applied, The liquid-like solubility and gas-like diffusivity make it possible to dissolve sufficient $CO_2$ in a polymer quickly. $CO_2$ is low-cost, non-flammable, chemically benign, and environmentally friendly.

Recently, microcellular foams, characterized by cell sizes smaller than 10 μm and cell density larger than $10^9$ cells/$cm^3$, have drawn a great deal of attention and interest. It has been shown that by keeping the cell (or bubble) size uniformly less than 10 microns in diameter, one can greatly reduce material usage without compromising mechanical properties because the bubbles are smaller than the preexisting flaws in a polymer matrix.

The field of polymer/clay nanocomposites has grown rapidly in the past decade. In this work, nano-sized particles, nanoclays, are applied to modify the cellular foams in both batch and continuous extrusion foaming process. The results show that with the addition of a very small amount of nanoclay into the polymer matrix, the nanocomposites exhibit substantial increase in many physical properties, including mechanical strength (tensile modulus and strength, flexural modulus and strength), thermal stability, flame retardance, and barrier resistance. Smectite clays, such as montmorillonite (MMT), are of particular interest because they have a high aspect ratio (lateral dimension ~200–500 nm, thickness <1 nm) and a high surface area. However, clay is hydrophilic in nature and incompatible with most polymers. To increase the compatibility and miscibility of clay in polymer, the clay surface is modified by an organic surfactant, typically ammonium cations with long alkyl chains.

Two idealized polymer/clay structures are possible: intercalated and exfoliated. Exfoliation involves extensive polymer penetration to disrupt the clay crystallite (tactoids), and the individual nanometer-thick silicate platelets are dispersed in the polymer matrix. If there is only limited polymer chain insertion in the interlayer region, and the interlayer spacing only expands to a certain extent without losing layer registry, then an intercalated nanocomposites is then formed.

Polymer foam is another area subject to intensive research. It is widely used for insulation, packaging, and structural applications, to name a few. Microcellular foam, which is characterized by cell size in the range of 0.1~10 μm, cell density in the range of $10^9$ to 1015 cells/cc, provides improved mechanical properties as well as increased thermal stability and lower thermal conductivity.

Cell nucleation and growth are two important factors controlling cell morphology. Particles can serve as a nucleation agent to improve heterogeneous nucleation. Some inorganic nucleation agents, such as talc, silicon oxide, kaoline, etc., are widely used. A fine dispersion of these nucleation agents can promote formation of nucleation center for the gaseous phase. Although a detailed explanation of the heterogeneous nucleation mechanism is still not available, the size, shape, and distribution, and surface treatment of particles have great influences on the nucleation efficiency. In this work, we developed a new polymer nanocomposite foam preparation technology to create polymer foams with controlled cell structure. In addition, clay may further improve the foam properties, e.g., mechanical and barrier properties, as well as fire resistance.

SUMMARY OF THE INVENTION

The present invention includes polymeric nanocomposite foams and a method for forming polymeric nanocomposite foams.

A method for forming a polymeric nanocomposite foam of the present invention comprises the steps of providing a mixture comprising: a polymer, an organophilic clay, and a blowing agent; and processing said mixture so as to cause formation of cells, thereby forming a polymeric nanocomposite foam.

Although any appropriate amount of blowing agent may be used, it is preferred that the mixture comprises at least 1% by weight of the blowing agent. It is more preferred that the mixture comprise at least 4% by weight of the blowing agent. It is most preferred that the mixture comprises at least 7% by weight of said blowing agent.

Although any desired amount of organophilic clay may be used, it is preferred that the mixture contain at least 0.5% by weight of the organophilic clay. It is more preferred that the mixture comprise at least 5% by weight of the organophilic clay. It is further preferred that the mixture comprise at least 10% by weight of the organophilic clay. It is most preferred that the mixture comprises at least 20% by weight of the organophilic clay.

While any appropriate polymer may be used in forming the polymeric nanocomposite foam, it is preferred that the polymer is selected from the group consisting of polystyrene, poly(methyl methacrylate), polypropylene, nylon, polyurethane, elastomers, and mixtures thereof.

It is preferred that the organophilic clay is dispersed throughout the polymer such that a x-ray diffraction pattern produced from the mixture is substantially devoid of an intercalation peak for producing exfoliated polymeric nanocomposite foams. It is preferred that organophilic clay is dispersed throughout the polymer such that a x-ray diffraction pattern produced from the mixture contains an intercalation peak for producing intercalated polymeric nanocomposite foams.

It is preferred that the organophilic clay comprises: a smectite clay; and a compound having the formula:

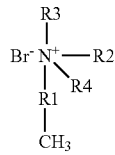

wherein R1 is $(CH)_n$ wherein n ranges from 6 to 20; R2 is a chemical structure having a terminal reactive double bond; R3 is an alkyl group; and R4 is an alkyl group.

It is most preferred that the compound have n=15, R3 as $CH_3$, R4 as $CH_3$, and R2 as:

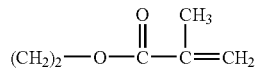

While any appropriate clay may be used, it is preferred to use smectite clay. It is more preferred that the smectite clay is selected from the group consisting of montmorillonite, hectorite, saponite, laponite, florohectorite, and beidellite.

The blowing gas may be any traditional blowing gas used in industry (for example: freon, nitrogen or air). However, it is preferred that the blowing agent is a supercritical fluid. It is most preferred that the blowing agent is supercritical carbon dioxide.

Cell size can vary widely depending upon operating conditions, however, it is preferred that the polymeric nanocomposite foam has an average cell size less than about 20 microns. It is additionally preferred that the polymeric nanocomposite foam has an average cell size greater than about 15 microns.

Cell density can vary widely depending on operating conditions, however, it is preferred that the polymeric nanocomposite foam has an average cell density greater than about $1 \times 10^6$ cells/cm$^3$. It is more preferred that the polymeric nanocomposite foam have an average cell density greater than about $1 \times 10^9$ cells/cm$^3$.

The polymer nanocomposite foam may be closed cell foam or open cell foam.

A polymeric nanocomposite foam of the present invention comprises a polymeric portion; an organophilic clay, the organophilic clay is dispersed throughout the polymeric portion; and a plurality of cells dispersed throughout the polymeric portion.

While any appropriate polymer may be used in the polymeric nanocomposite foam, it is preferred that the polymeric portion comprises a polymer selected from the group consisting of polystyrene, poly(methyl methacrylate), polypropylene, nylon, polyurethane, elastomers, and mixtures thereof.

It is preferred that the organophilic clay is dispersed throughout the polymer such that a x-ray diffraction pattern produced from the mixture is substantially devoid of an intercalation peak for exfoliated polymeric nanocomposite foams. It is preferred that organophilic clay is dispersed throughout the polymer such that a x-ray diffraction pattern produced from the mixture contains an intercalation peak for intercalated polymeric nanocomposite foams.

While any organophilic clay may be used, it is preferred that the organophilic clay portion comprises: a smectite clay; and a compound having the formula:

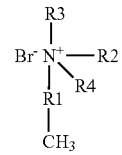

wherein R1 is $(CH)_n$ wherein n ranges from 6 to 20; R2 is a chemical structure having a terminal reactive double bond; R3 is an alkyl group; and R4 is an alkyl group.

It is most preferred that the compound have n=15, R3 as $CH_3$, R4 as $CH_3$, and R2 as:

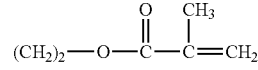

While any appropriate clay may be used, it is preferred to use smectite clay. It is more preferred that the smectite clay is selected from the group consisting of montmorillonite, hectorite, saponite, laponite, florohectorite, and beidellite.

Cell size can vary widely depending upon operating conditions, however, it is preferred that the polymeric nanocomposite foam has an average cell size less than about 20 microns. It is additionally preferred that the polymeric nanocomposite foam has an average cell size greater than about 15 microns.

Cell density can vary widely depending on operating conditions, however, it is preferred that the polymeric nanocomposite foam has an average cell density greater than about $1 \times 10^6$ cells/cm$^3$. It is more preferred that the polymeric nanocomposite foam has an average cell density greater than about $1 \times 10^9$ cells/cm$^3$.

The polymer nanocomposite foam may be closed cell foam or open cell foam.

DETAILED DESCRIPTION OF THE PREFERRED EMBODIMENT(S)

In accordance with the foregoing summary, the following presents a detailed description of the preferred embodiments of the invention that is currently considered to be the best mode.

Figure 1:
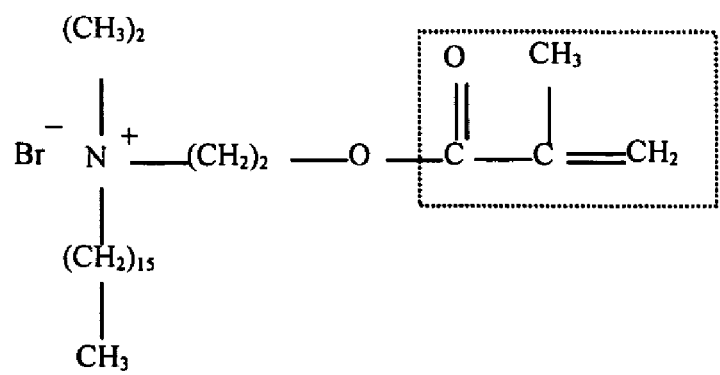
FIG. 1 shows the chemical structure of the surfactant 2-methacryloyloxyethylhexadecyldimethyl ammonium bromide (MHAB).

Materials. Styrene (St), Methyl Methalcrylate (MMA) and initiator 2,2'-azobisisobutyronitrile (AlBN), were purchased from Aldrich. A polystyrene resin (Fina) was used to prepare nanocomposites by extrusion. Two types of organically modified montmorillonite clays were used in this study. Cloisite 20A (20A) was donated by Southern Clay. The interlayer cation is dimethyl dehydrogenated tallowalkyl ammonium onium. $Na^+$-montmorillonite (CEC=90 meq/100 g) was also from Southern Clay. A reactive cationic surfactant 2-methacryloyloxyethylhexadecylditnethyl ammonium bromide (MHAB) was synthesized and ion-exchanged with $Na^+$-montmorillonite to prepare the organophilic clay, according to the procedure published elsewhere. The chemical structure of the surfactant MHAB is shown in FIG. 1. The modified clay is denoted as MHABS. Praxair provided the foaming agent, a bone-dry grade of carbon dioxide.

Preparation of Polymer/Clay Nanocomposites. Both twin-screw extrusion and in-situ polymerization was used to prepare PS/clay and PMMA/clay nanocomposites. In-situ polymerization was carried out under isothermal conditions at 60° C. for styrene and 50° C. for MMA. The monomer, clay and a certain amount of AlBN were mixed together using a high shear mixer. The mixture was then reacted for 20 hrs, then the temperature was raised to 105° C. for another 30 min. 5% exfoliated nanocomposites prepared by in-situ polymerization were used for extrusion foaming. 20% exfoliated PS nanocomposite masterbatch was blended with polystyrene (PS) to prepare exfoliated nanocomposites, using a DACA microcompounder for batch foaming. Intercalated nanocomposites were prepared using a Leistritz ZSE-27 intermesh twin screw extruder (L/D=40, d=27 mm) operated in the co-rotating mode. The screw speed was 200 rpm.

Foaming of Polymer/Clay Nanocomposites. Batch foaming was performed at 120° C. $CO_2$ was delivered via a syringe pump. The system was allowed to equilibrate for 24 hrs for $CO_2$ to reach saturation in the polymer matrix. The pressure was then rapidly released and the foamed cells were fixed by cooling with water. The saturation pressure was 2000 psi and the pressure was released in 2–3 seconds for cell nucleation.

The microcellular foaming extrusion was performed on a two-stage single-screw extruder (HMKE Rheomex 252P). A static mixer (Omega, FMX8441S) was attached to the end of the extruder to provide extra mixing capacity. A capillary die with a 0.5 mm diameter and 10 mm length nozzle was custom made to generate a high and rapid pressure drop. $CO_2$ was delivered from a syringe pump (ISCO 260D) with a cooling jacket. The $CO_2$ pressure and volumetric flow rate can be read precisely from the pump controller.

$CO_2$ is compressed to a certain pressure in the syringe pump at 40° C. reaching a supercritical state. 4-wt % of $CO_2$ was injected into the extruder barrel by carefully controlling the pressure and volumetric flow rate of $CO_2$. Upon injection into the barrel, it is mixed with the polystyrene melt by screw rotation. A single-phase solution is formed when the mixture flows through the static mixer. Nucleation occurs in the die because of the solubility reduction due to the quick and large pressure drop realized by the narrow capillary nozzle. The foamed extrudate flows freely out to the air and vitrifies.

Analytical Methods. The X-ray diffraction (XRD) patterns of prepared polymer/clay nanocomposites were recorded on a Scintag XDS-2000 X-ray diffractometer with Cu Kα radiation and operated at 35 kV and 10 mA. Transmission electron microscopy (TEM) image was obtained from a Phillip CM12 using an accelerating voltage of 80 kV. The nanocomposite samples were microtomed at room temperature with a diamond knife and mounted on a 200 mesh copper grid. A Phillip XL30 scanning electron microscope was also used to observe the cell morphology.

Figure 2:
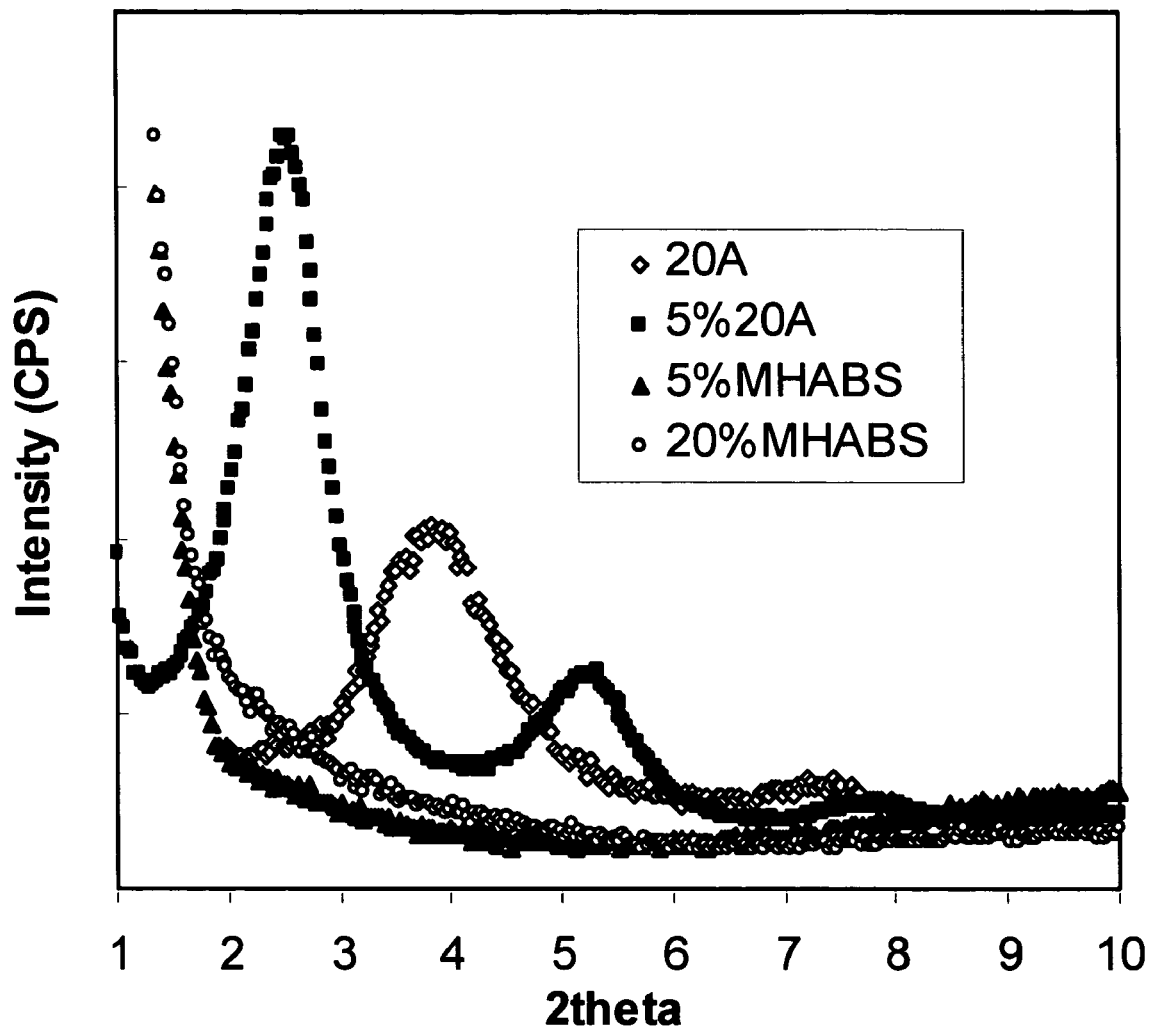
FIG. 2 provides XRD patterns for various PS/clay nanocomposites.
Figure 3:
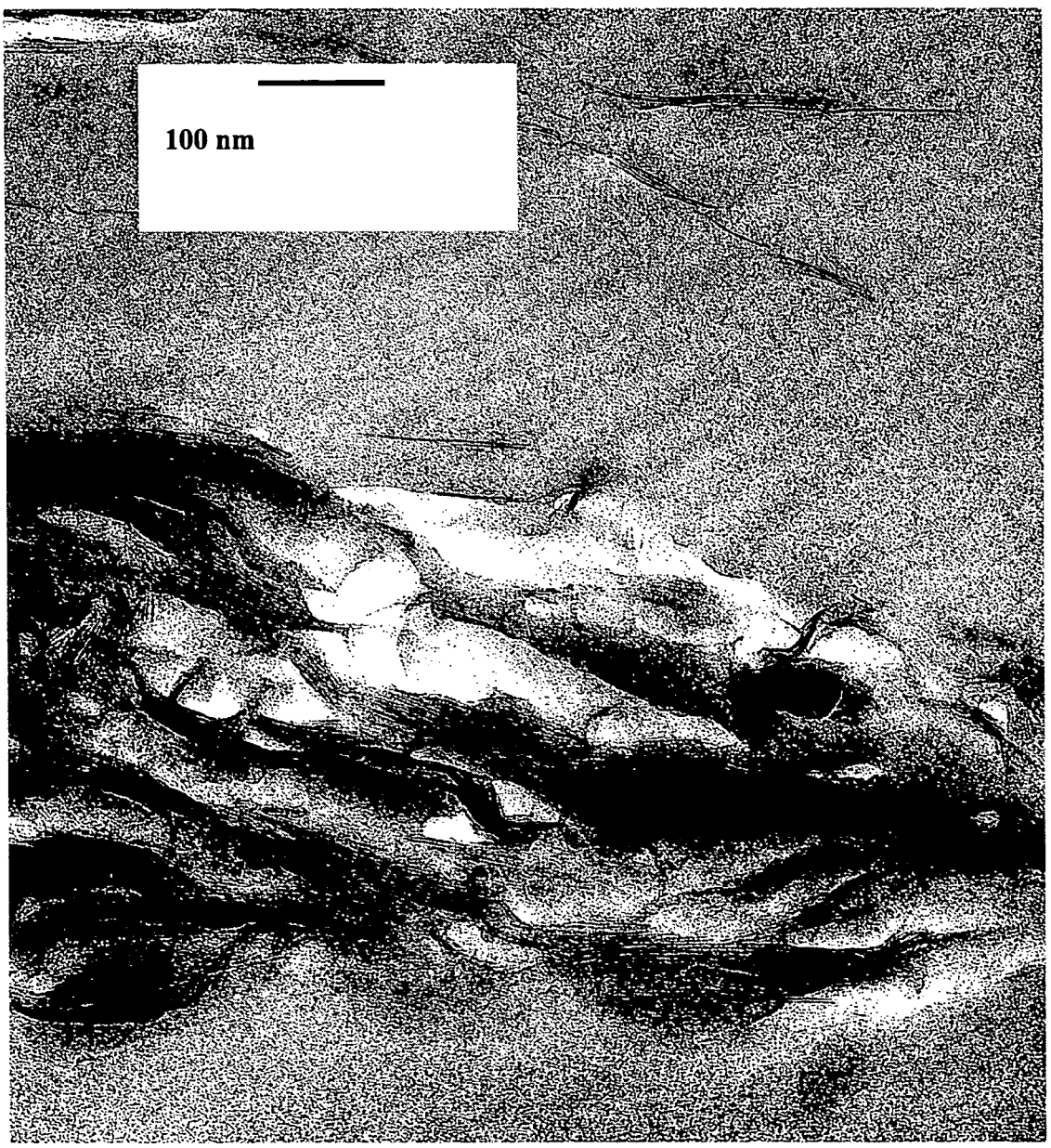
FIG. 3 is a TEM micrograph of intercalated PS/20A nanocomposite demonstrating the large clay aggregates that are still present in the matrix.
Figure 4:
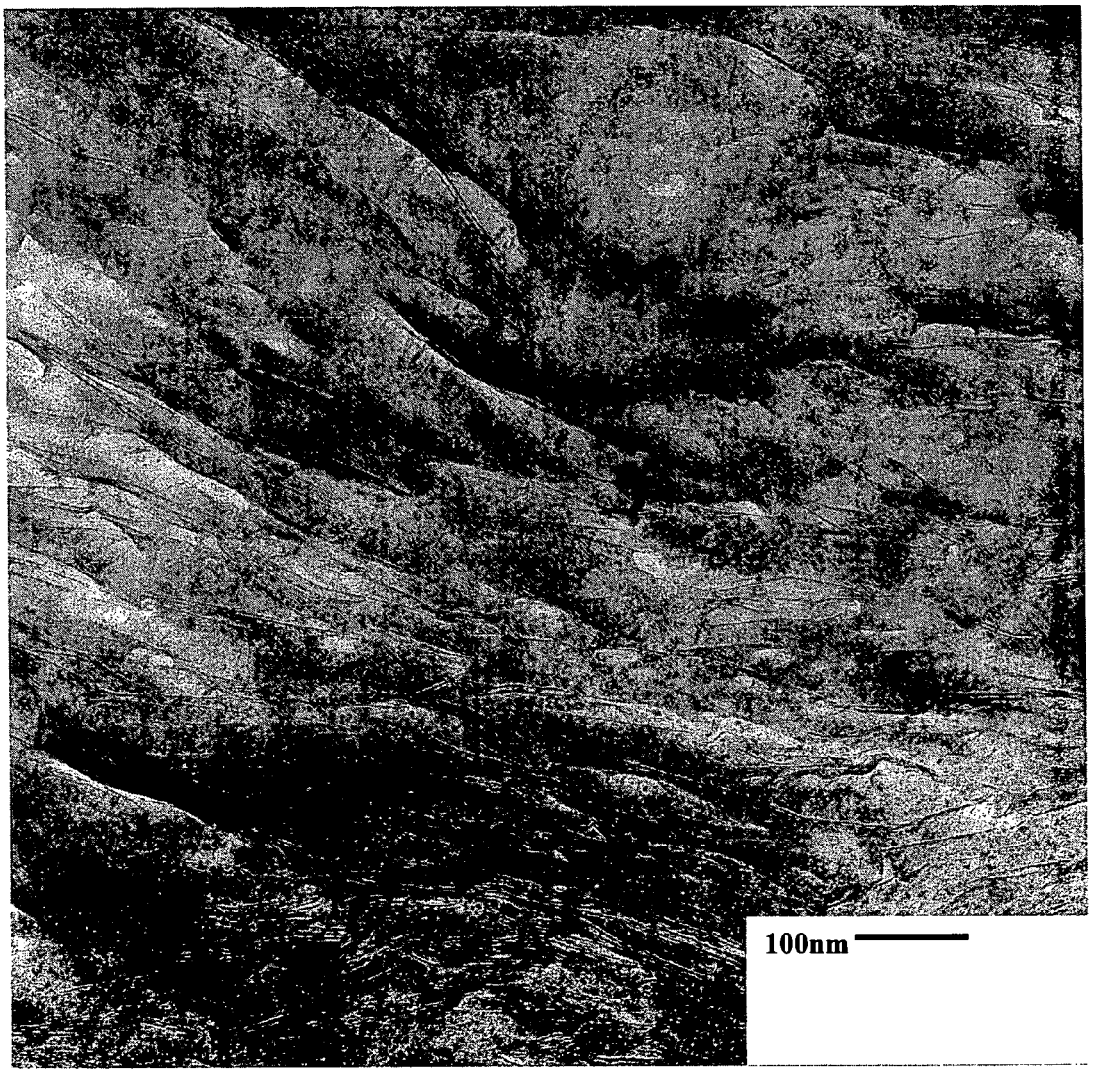
FIG. 4 is a TEM micrograph of exfoliated PS/MHABS nanocomposite showing how the tactoids have been completely delaminated and uniformly dispersed.

Results and Discussion: Structure of Nanocomposites Montmorillonite clay particles contain thousands of individual layers with a thickness dimension ~1 nm and lateral dimension ~1 μm. The polymer chain penetration and interlayer expansion depend on the compatibility of the polymer matrix and the clay surface. Intercalated nanocomposites usually form when there is only limited insertion of a polymer chain into the interlayer region. This results in the interlayer expansion and can be detected by x-ray diffraction (XRD). FIG. 2 shows the XRD of PS/clay nanocomposites. For PS/5%20A, the shift of the diffraction peak to a lower angle region clearly verifies the polymer chain intercalation. The (d001) basal spacing increased from 2.3 nm to 3.4 nm. The TEM micrograph of FIG. 3 demonstrates that large clay aggregates are still present in the matrix. Face-to-face layer stacking and low angle intergrowth of tactoids are still observable. On the other hand, by using the reactive surfactant MHAB, the copolymerization of MHAB and styrene monomer helped layer separation and exfoliated nanocomposite was synthesized with a clay concentration up to 20%. The XRD of PS/5%MHABS and PS/20%MHABS show featureless pattern (FIG. 2). A TEM micrograph of PS/20%MHABS is shown in FIG. 4. The tactoids have been completely delaminated and uniformly dispersed in the matrix. Most clay layers are present as single layers, while stacks of a few layers are also observable in some region.

Figure 5:
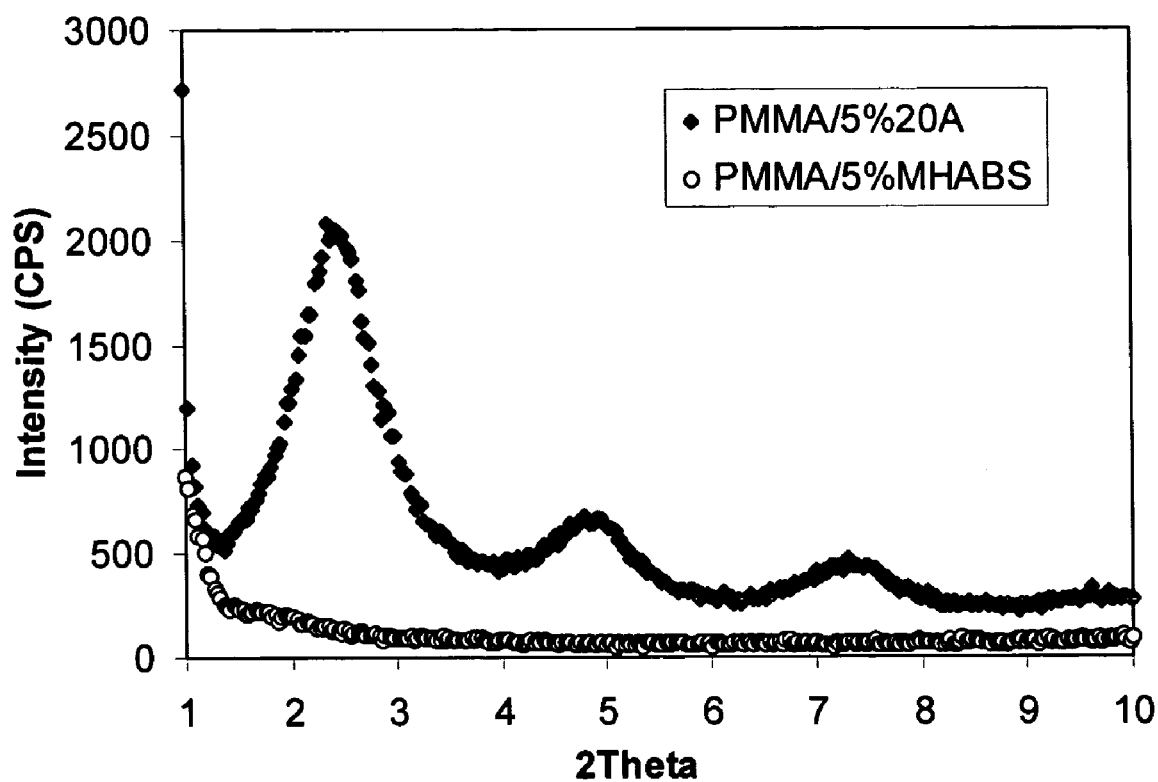
FIG. 5 provides XRD patterns for various PMMA/clay nanocomposites.

This nanocomposite was then blended with PS to make nanocomposites for the foam experiments. FIG. 5 shows the XRD of PMMA/clay nanocomposites. For PMMA/5%20A, the shift of the diffraction peak to a lower angle region clearly verifies the polymer chain intercalation. The (d001) basal spacing increased from 2.3 nm to 3.6 nm. Again, the diffraction peak disappears for the exfoliated PMMA/5%MHABS nanocomposite.

Figure 6:
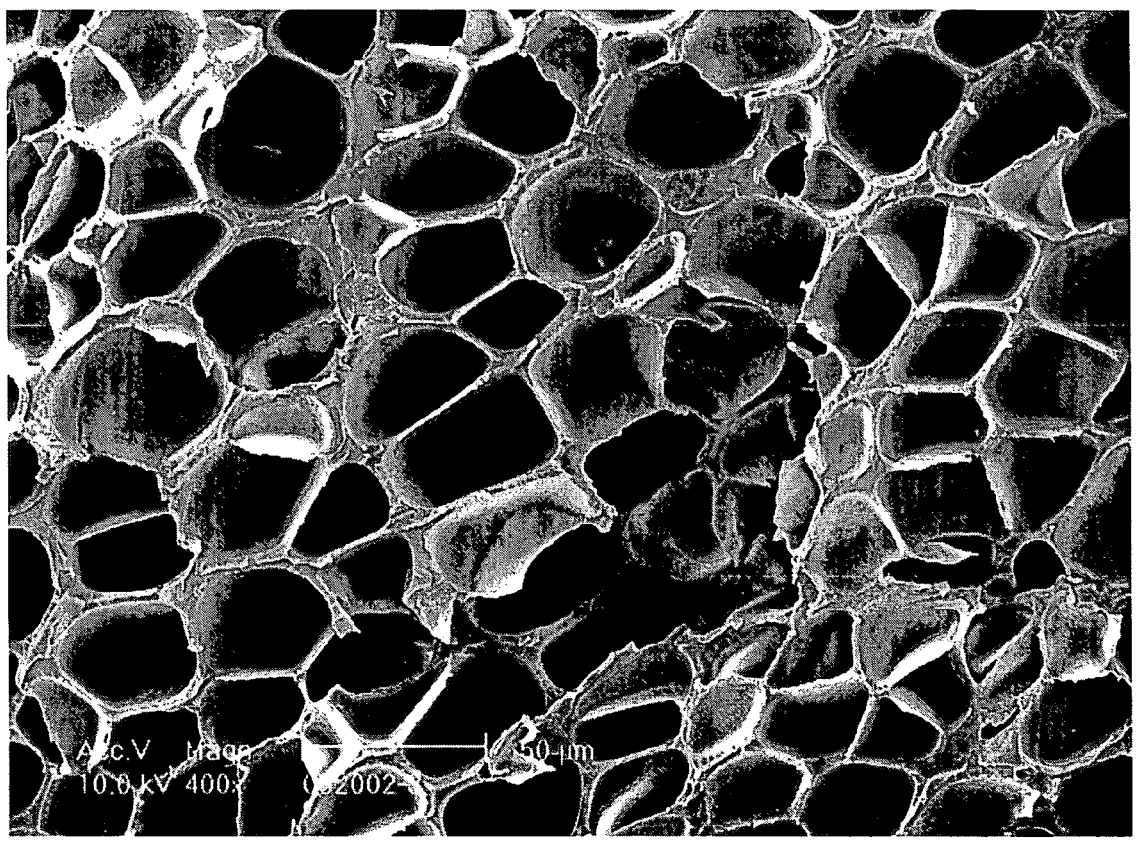
FIG. 6 is a SEM micrograph of polystyrene foam produced by a batch foaming procedure.
Figure 7:
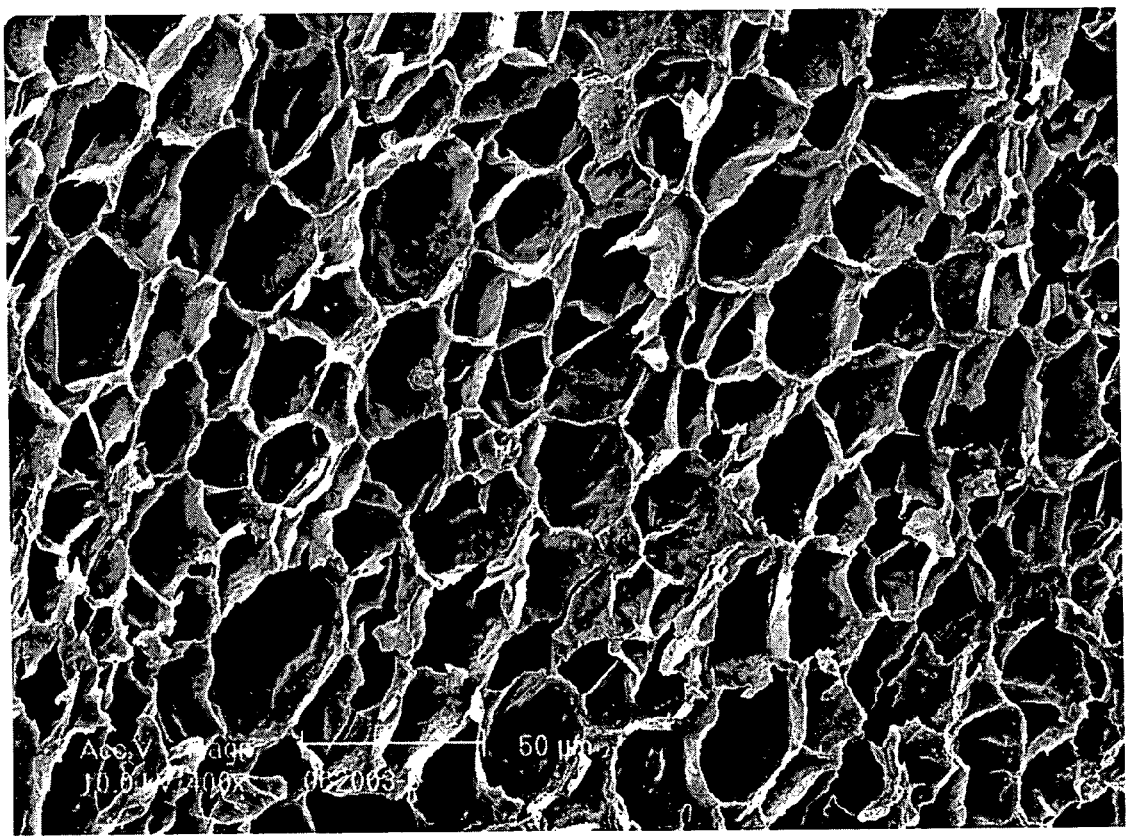
FIG. 7 is a SEM micrograph of PS/5%20A foam produced by a batch foaming procedure.
Figure 8:
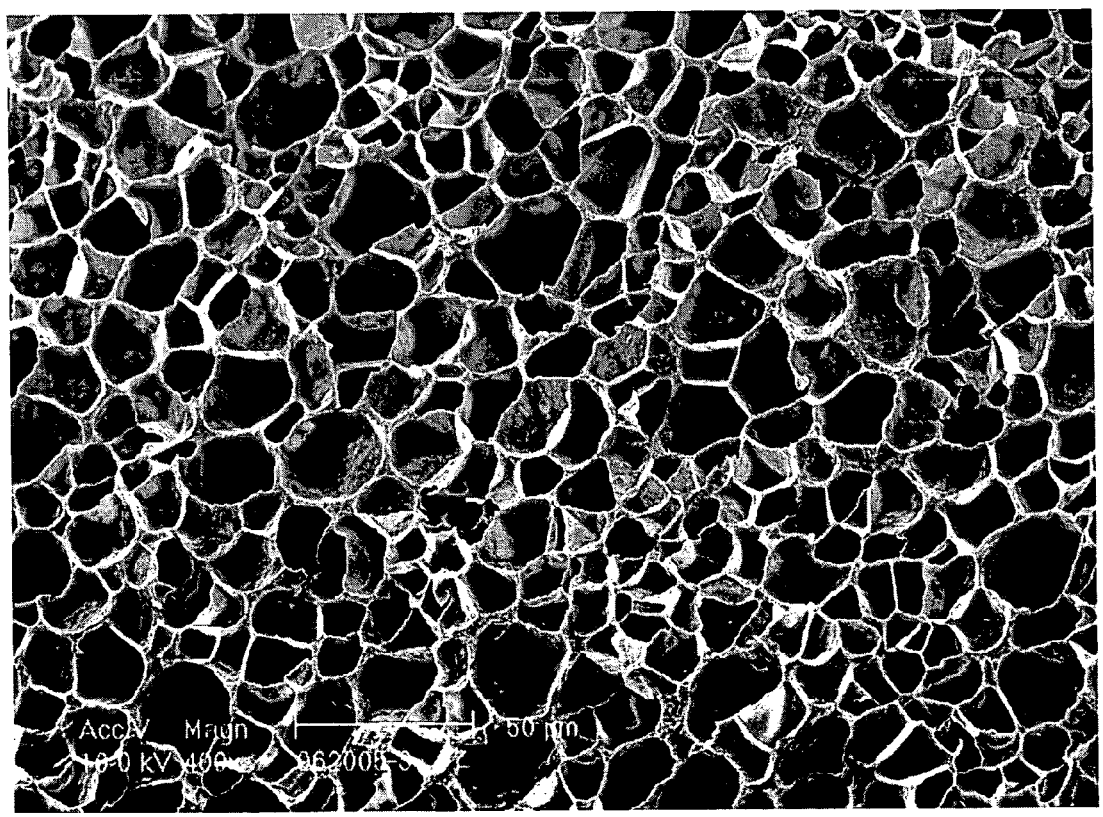
FIG. 8 is a SEM micrograph of PS/5%MHABS foam produced by a batch foaming procedure.
Figure 9:
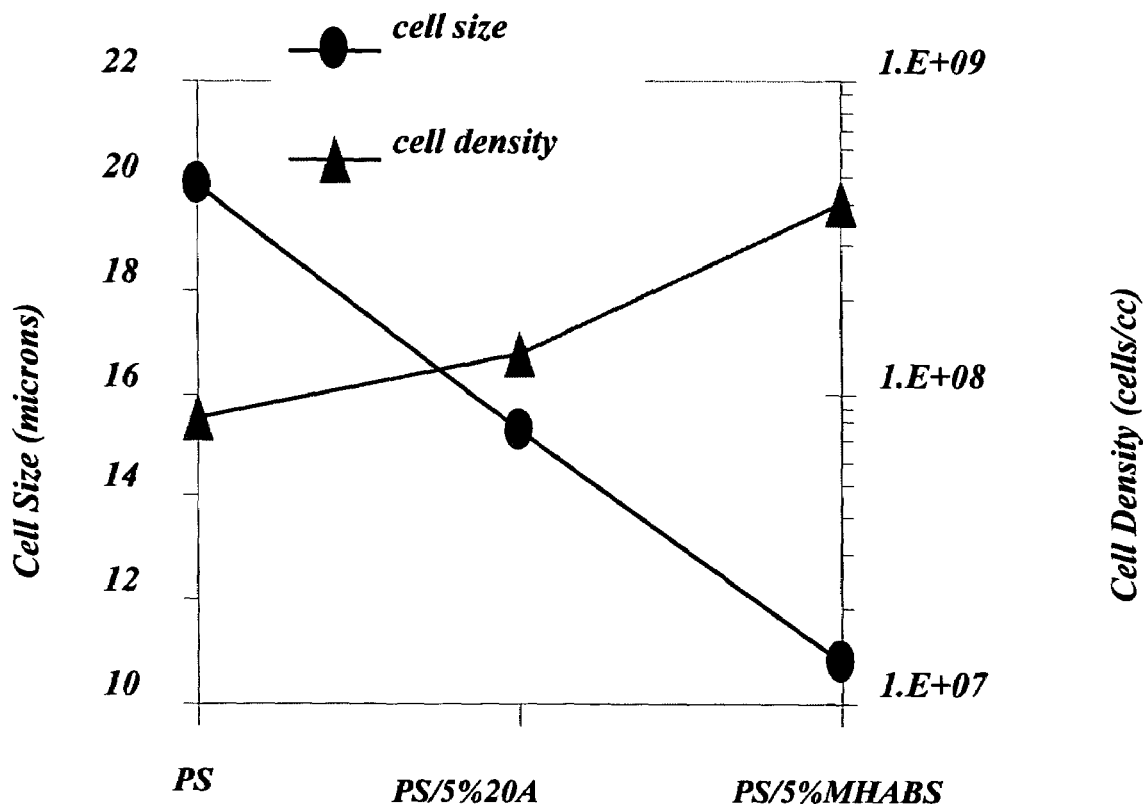
FIG. 9 compares cell size and cell density for PS and PS/clay nanocomposite foams.
Figure 10:
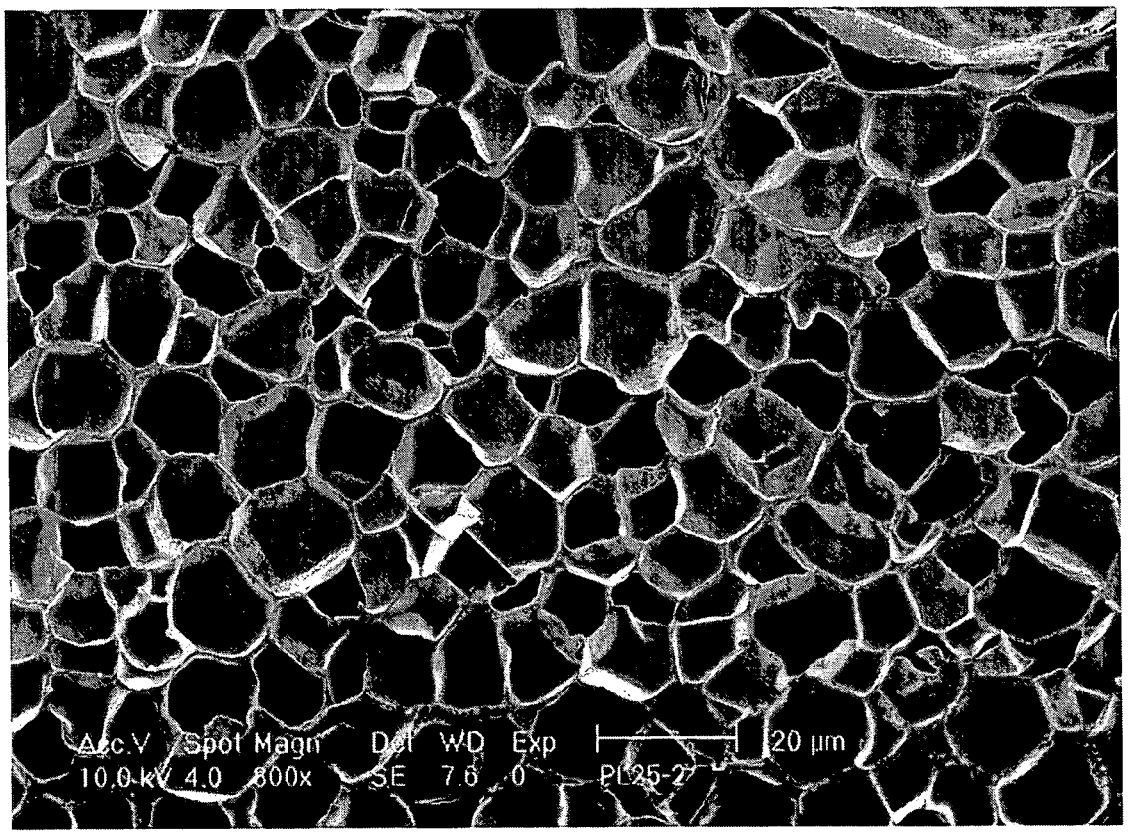
FIG. 10 is a SEM micrograph of PMMA foam produced by a batch foaming procedure.
Figure 11:
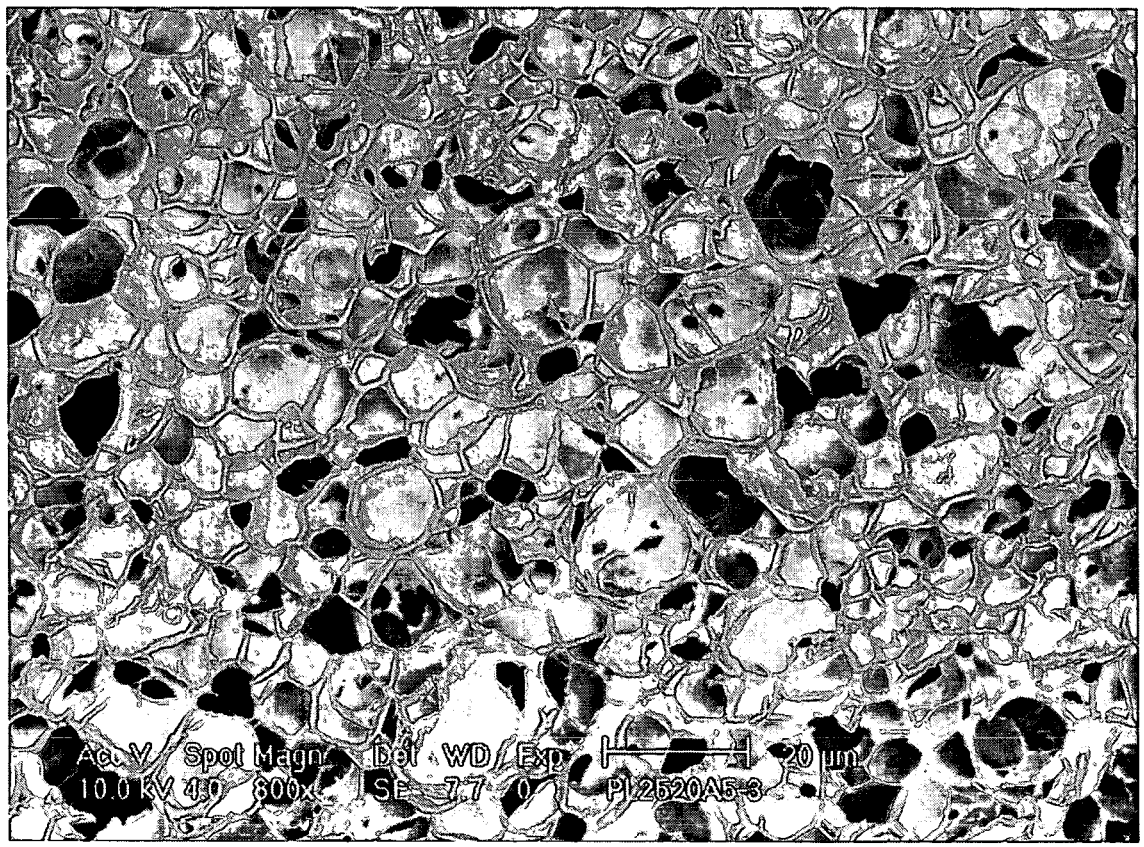
FIG. 11 is a SEM micrograph of PMMA/5%20A foam produced by a batch foaming procedure.
Figure 12:
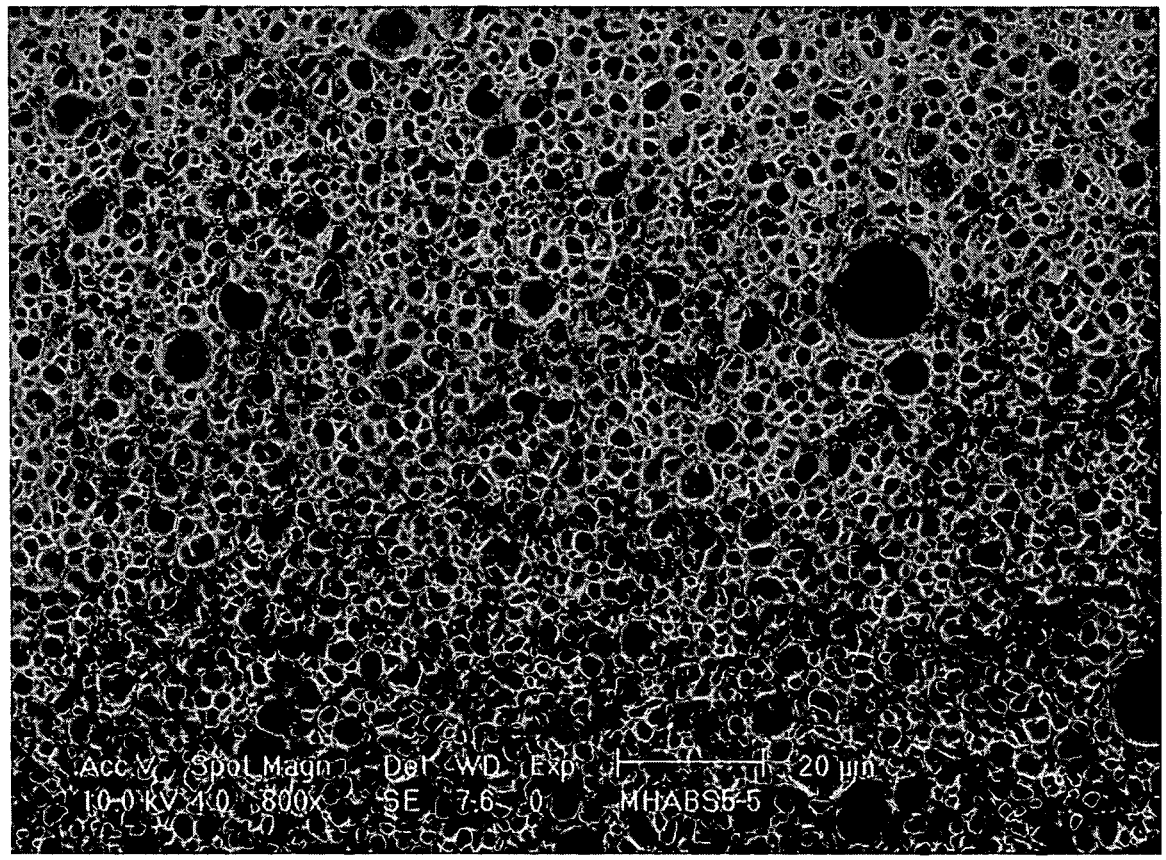
FIG. 12 is a SEM micrograph of PMMA/5%MHABS foam produced by a batch foaming procedure.
Figure 13:
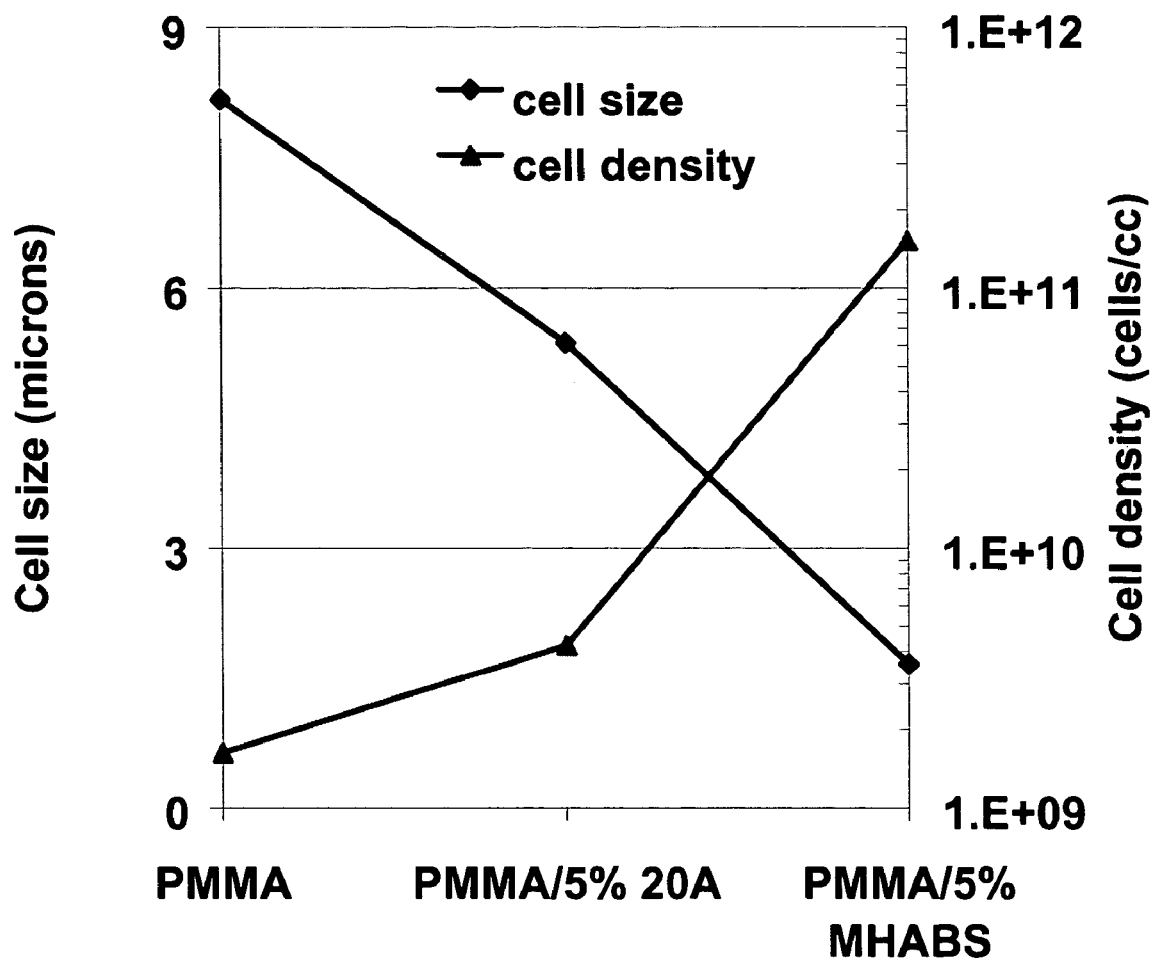
FIG. 13 compares cell size and cell density for PMMA and PMMA/clay nanocomposite foams.

Effect of Clay Dispersion. Batch foaming experiments were conducted to compare the effect of different clay dispersions on the foam cell morphology, as shown in FIGS. 6–8. The clay concentration is 5-wt %. With the addition of clay, the cell size decreases and the cell density increases. Image analysis was used to obtain the average cell size and cell density, and the result is shown in FIG. 9. In the presence of 5%20A, the cell size decreases from 20 µm to 15 µm, and the cell density increases from $8.2 \times 10^7$ to $1.3 \times 10^8$. The exfoliated nanocomposite foam has an average cell size of 11 µm and cell density of around $4.2 \times 10^8$. The clay may serve as a heterogeneous nucleation agent allowing more sites to nucleate and grow. This leads to an increase in cell density. While more cells start to grow at the same time, there is less opportunity for the individual cells to grow bigger, leading to a smaller cell size. In intercalated nanocomposites, most clay exists as stacks of layers or tactoids, serving as nucleation sites. On the other hand, in exfoliated nanocomposites, clay is present mostly as individual layers and usually the distance between the layers is greater than the effective radius of gyration of a polymer chain. Unlike in intercalated nanocomposites where polymer chain penetration is limited and the major contact area is the outer surface of the tactoids, in exfoliated nanocomposites the individual layer is in direct contact with the matrix, providing much larger interfacial area for $CO_2$ adsorption and cell nucleation. In other words, once exfoliated, the effective particle concentration is higher and the number of nucleation sites increases. As a result, the exfoliated nanocomposite foam shows the highest cell density and the smallest cell size. Another factor that may affect the cell size and density is the rheological properties of the nanocomposites. Further, we obtained extremely small cell size (<1.6 µm) and large cell density (>$10^{11}$ cells/cm$^3$) when PMMA and its nanocomposites were foamed even in a batch process. The morphology was shown in FIGS. 10–12. The major reason is believed to be the higher solubility of $CO_2$ in PMMA. The cell size and cell density were compared in FIG. 13.

Figure 14:
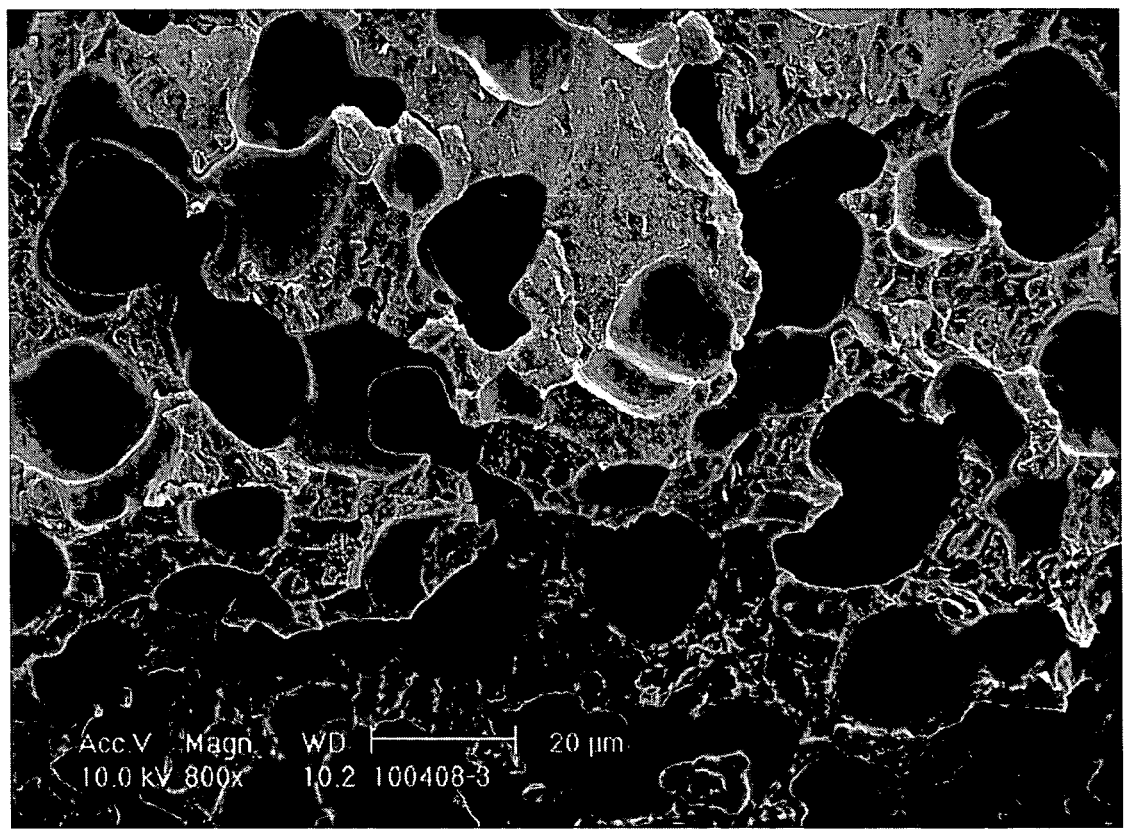
FIG. 14 is a SEM micrograph of PS/talc filler foam produced by extrusion.
Figure 15:
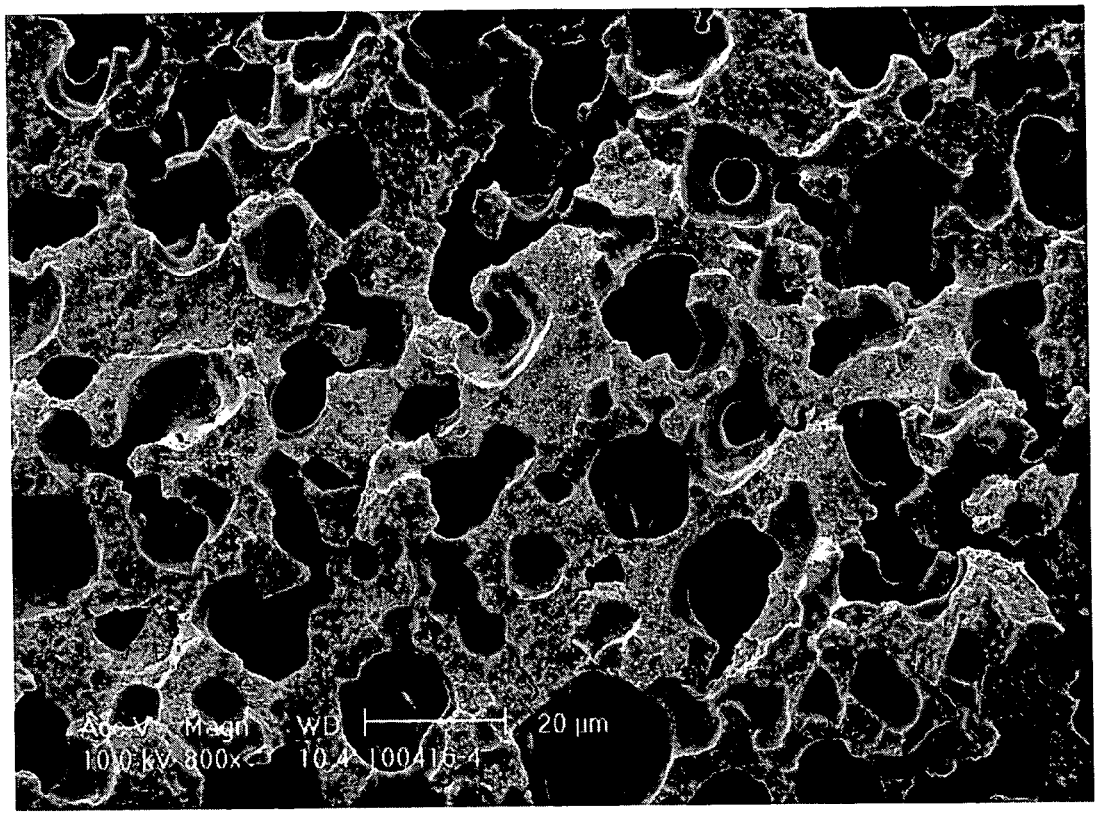
FIG. 15 is a SEM micrograph of PS/20A foam produced by extrusion.
Figure 16:
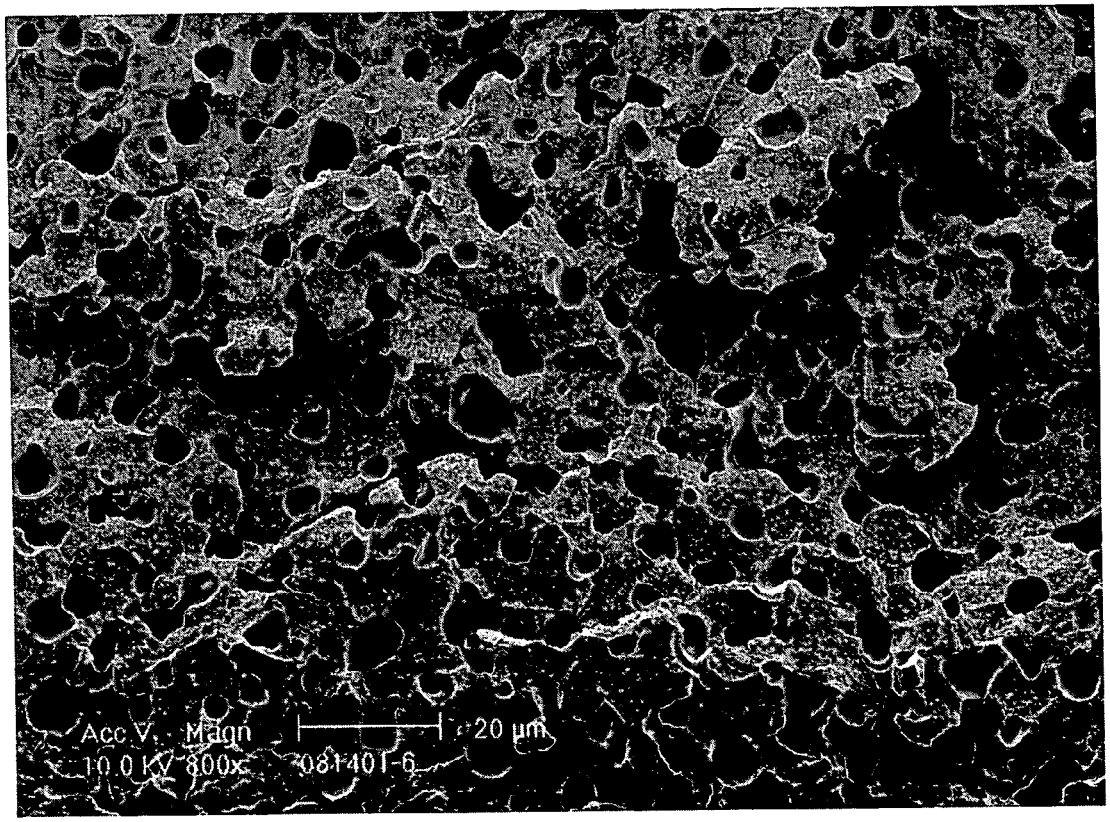
FIG. 16 is a SEM micrograph of PS/MHABS foam produced by extrusion.

Both intercalated and exfoliated PS/clay nanocomposites were foamed in a single screw extruder. For comparison, PS/talc foams were also prepared in the same extruder. The cell morphology is shown in FIGS. 14–16. Cells in PS/talc are much larger and the cell density is much lower than those in PS/20A at the same particle concentration. Once exfoliated, the nanocomposite foam has the smallest cell size and the highest cell density. Exfoliated nanocomposite shows perfect microcellular foam structure in which cells are round in shape, closed, and well separated from each other. Very few cell coalescence was observed. The calculated average cell size and cell density are 4.9 microns and $1.5 \times 10^9$ cells/cm$^3$ respectively. In addition, the exfoliated composite extrudate exhibits a very smooth and shining surface that comes from the orderly alignment of the single clay layers, the small cell size, and the few flaws in the polymer matrix.

Figure 17:
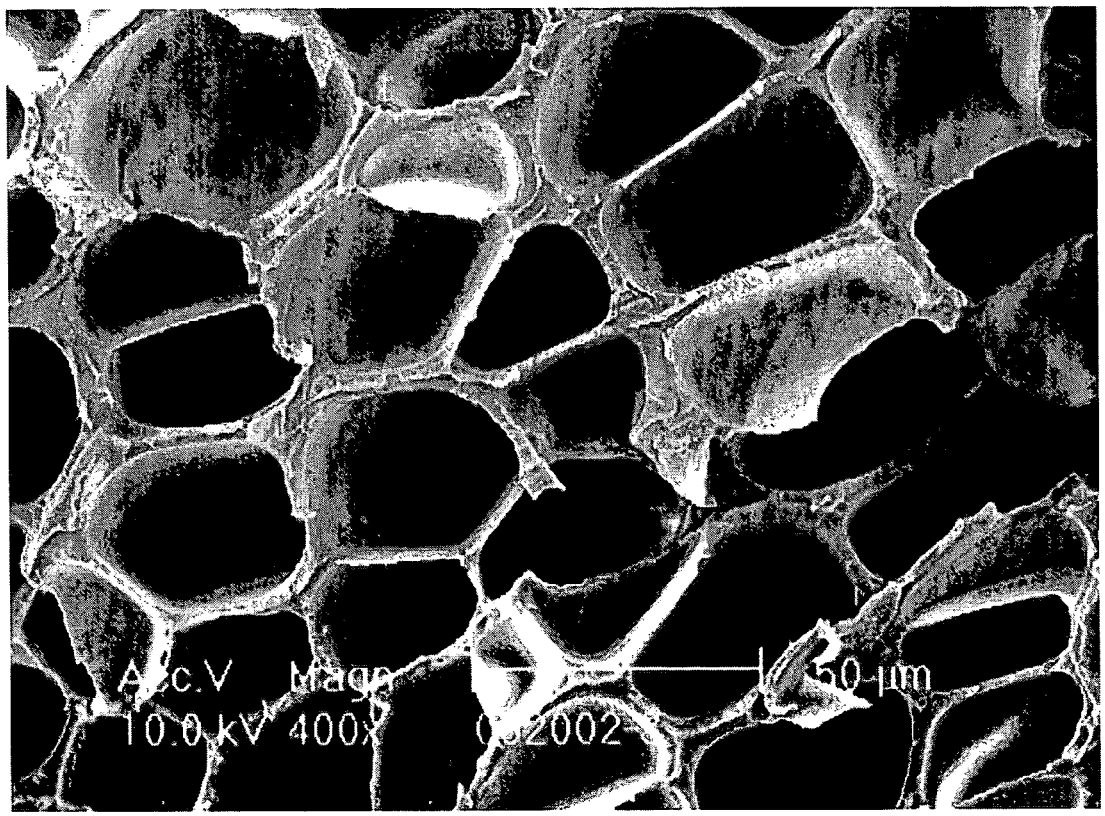
FIG. 17 is a SEM micrograph of PS foam by a batch foaming procedure.
Figure 18:
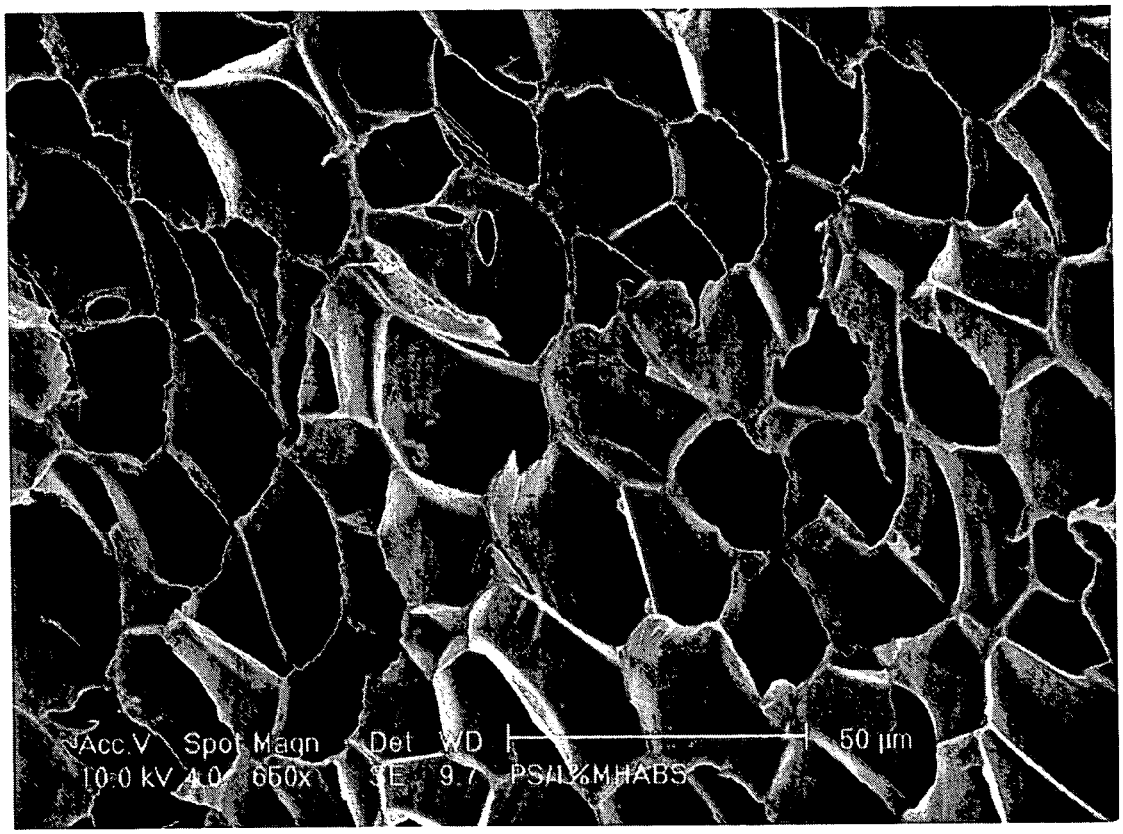
FIG. 18 is a SEM micrograph of PS/1%MHABS foam by a batch foaming procedure.
Figure 19:
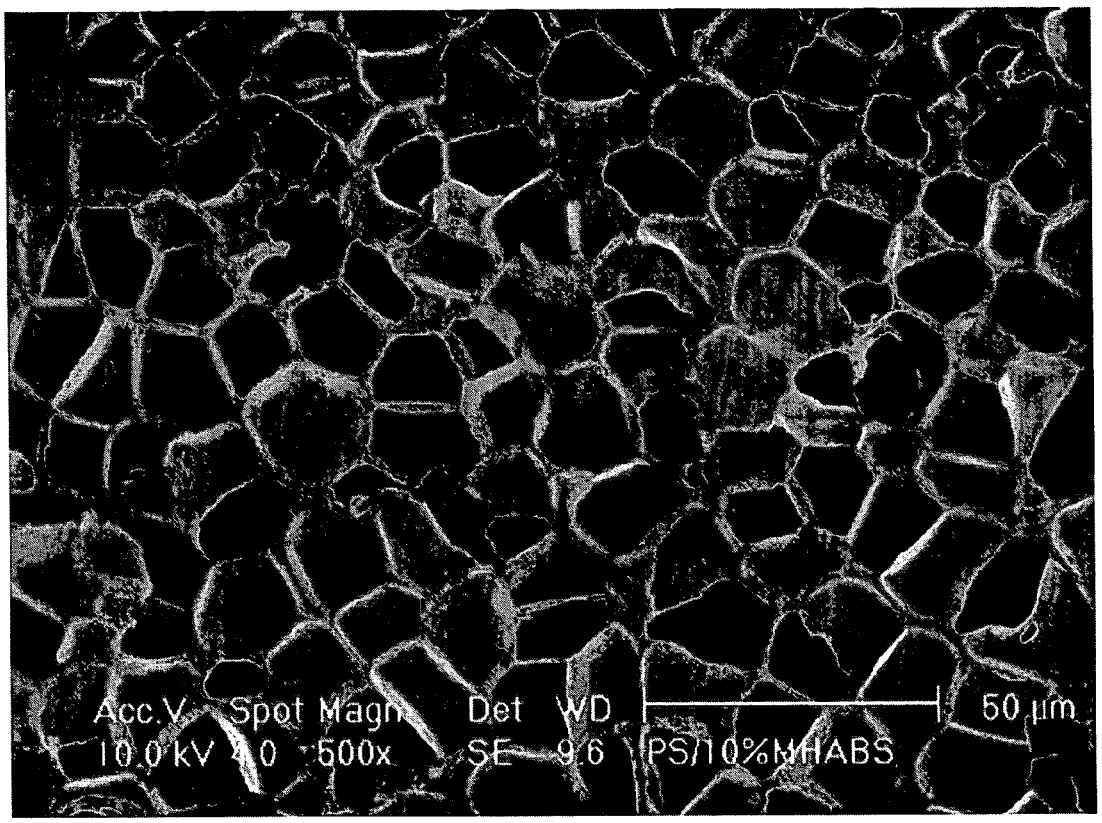
FIG. 19 is a SEM micrograph of PS/10%MHABS foam by a batch foaming procedure.
Figure 20:
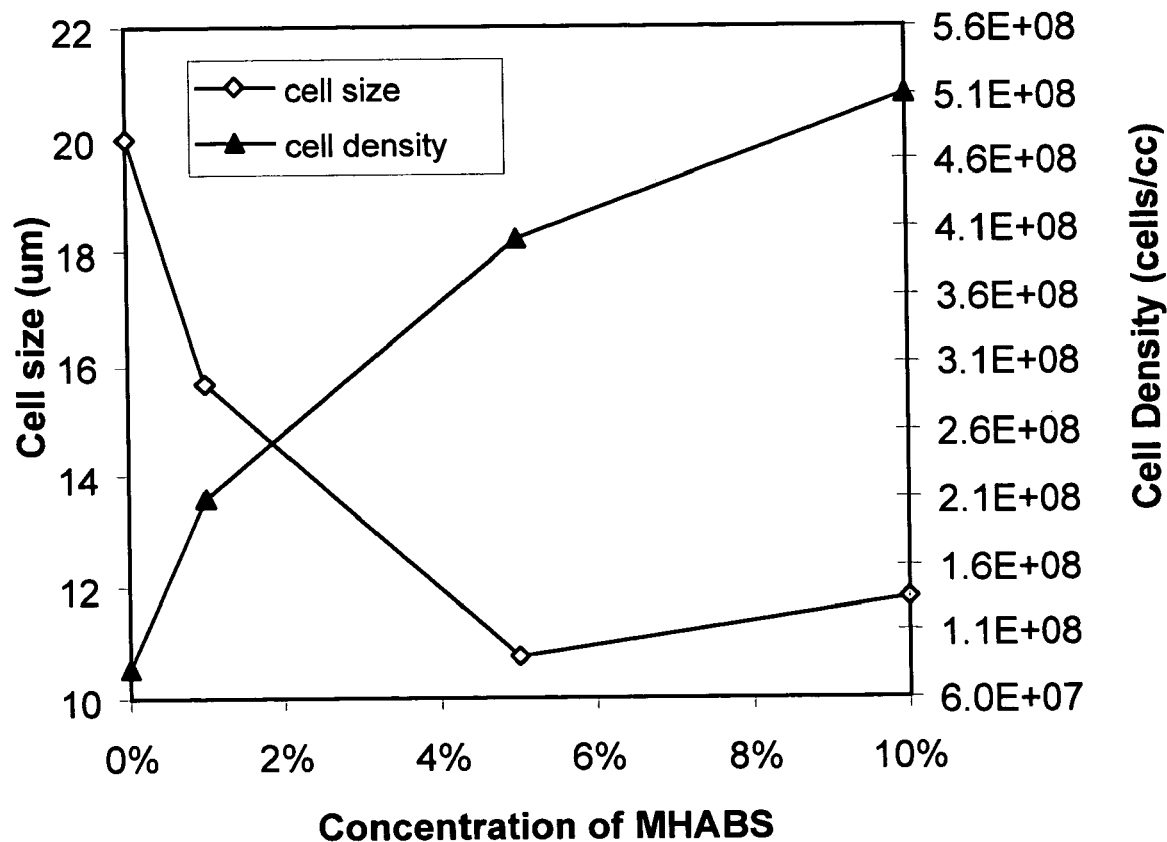
FIG. 20 shows the effect of clay concentration on cell size and density based upon the concentration of MHABS by a batch foaming procedure.
Figure 21:
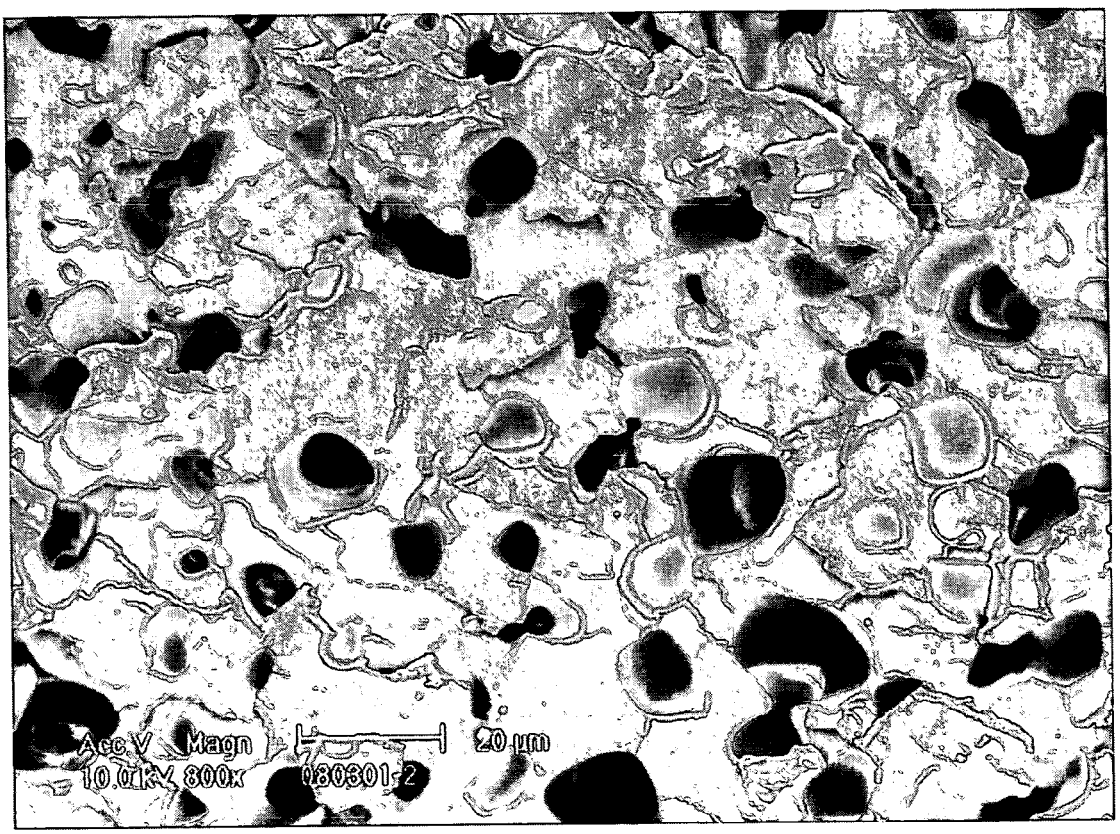
FIG. 21 is a SEM micrograph of pure PS foam.
Figure 22:
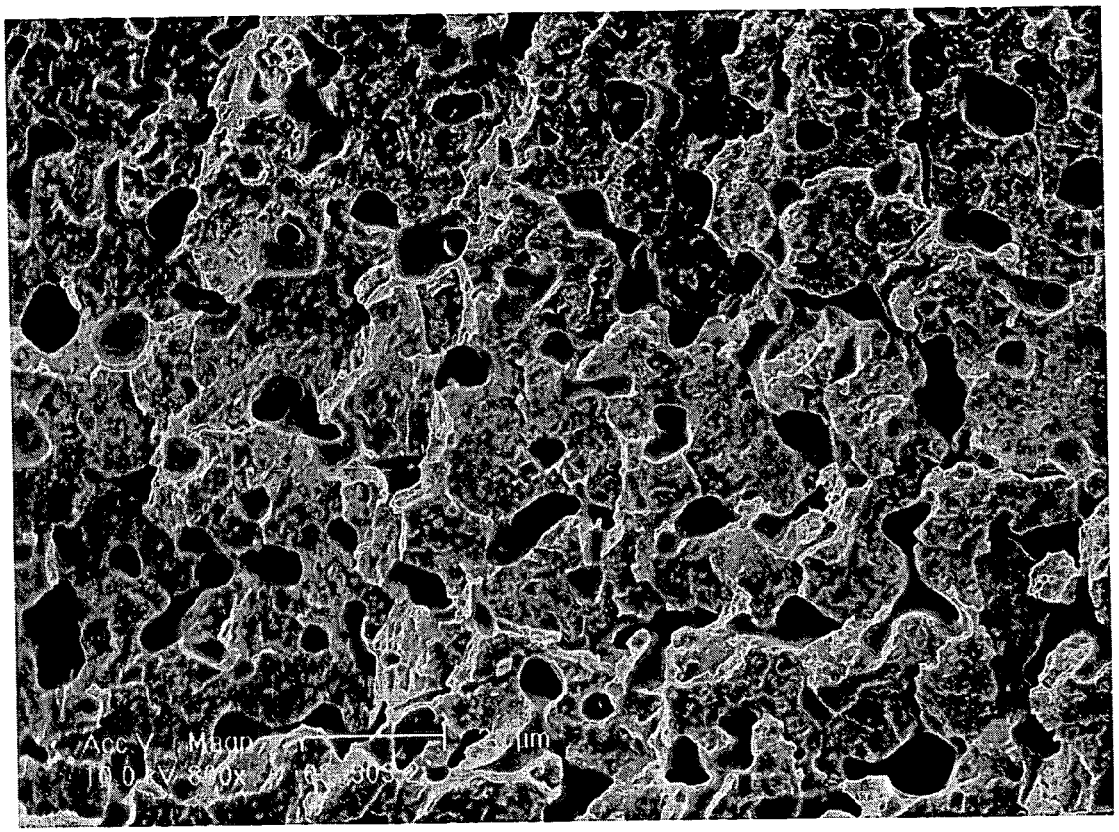
FIG. 22 is a SEM micrograph of PS/2.5-wt %20A foam.
Figure 23:
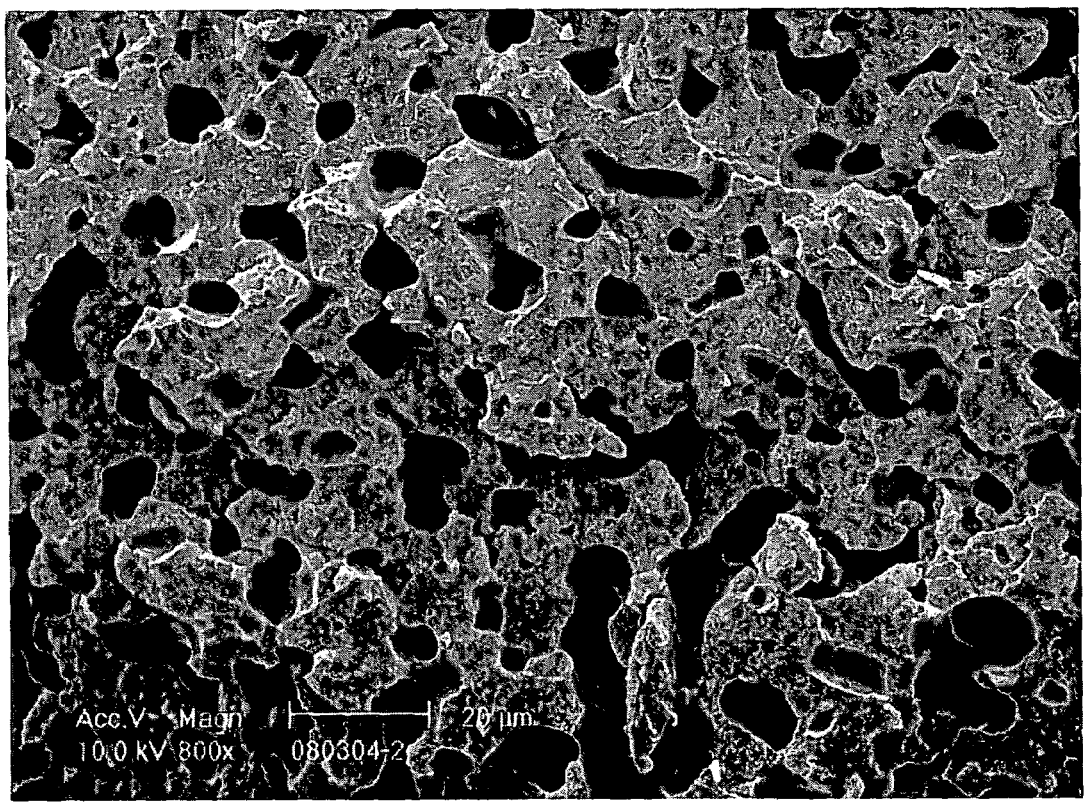
FIG. 23 is a SEM micrograph of PS/5-wt %20A foam.
Figure 24:
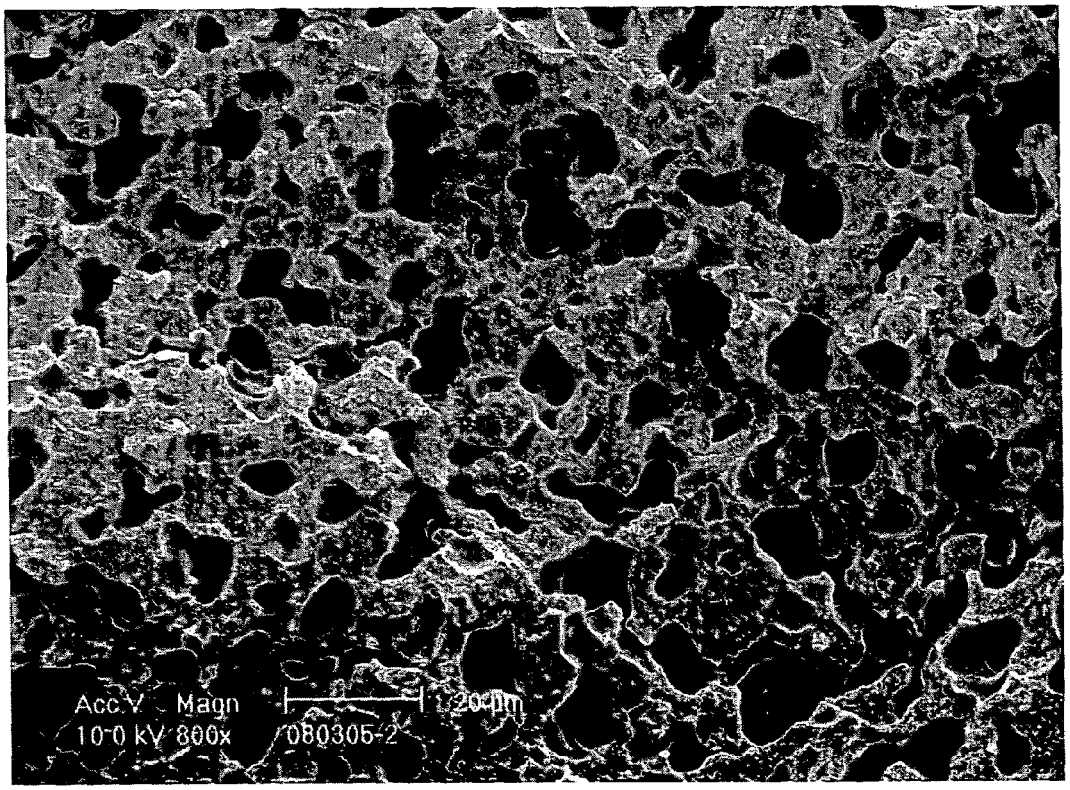
FIG. 24 is a SEM micrograph of PS/7.5-wt %20A foam.

Effect of clay concentration A series of exfoliated PS/MHABS nanocomposites (1%, 5%, and 10%) were foamed (T=120° C., P=2000 psi) to study the effect of clay concentration on cell morphology. The SEM micrographs are shown in FIGS. 17–19. And the cell size and density are shown in FIG. 20. Adding 1%MHABS greatly reduces the cell size and increases cell density. The cell size of this nanocomposite foam is comparable to that of 5% 20A nanocomposite foam, while the cell density is higher. This supports our hypothesis that the individual layers are capable of serving as nucleation sites. Even though the apparent concentration of MHABS is lower than 20A, there may be more interfacial area between the clay and the matrix due to exfoliation. Adding 5% MHABS can further reduce cell size and increase cell density. However, further increasing the clay concentration to 10% seems only to increase cell density, while cell size remains almost unchanged. During foaming, both nucleation and growth will affect the cell size and density. And the cell growth depends strongly on the polymer Theological properties, which are affected greatly by the presence of clay. Both shear and elongational viscosity increase when clay is added. The individual layers as well as the tactoids can form a percolated structure at the mesoscopic level, impeding the motion of the polymer chain and thus increasing the shear viscosity. The exfoliated nanocomposites show a higher viscosity than the intercalated nanocomposites. The increase of the viscosity hinders the cell growth, resulting in a smaller cell size. The reason for the nearly the same cell size for the 5% and 10% nanocomposite foams is unclear. A possible explanation is as follows. When there are more clay platelets and more cell nucleation, it is more probable for cells to meet each other and form larger cells. This will lead to an increase in cell size.

We have showed that the addition of clay can help reduce cell size and increase cell density. However, these nanocomposite foams are still are in the microcellular foam range. During batch foaming, the pressure drop rate is not high enough, and therefore there is sufficient time for cells to grow. In the continuous extrusion foaming, the operating conditions can be controlled to generate a high enough pressure drop. In fact, microcellular nanocomposite foams were prepared in our lab.

To investigate the effect of nanoclay on microcellular foaming extrusion, nanocomposites with different 20A concentration (0–10 wt %) were foamed in the single screw extruder under similar operation conditions. The cell size decreases dramatically after a small amount of nanoclay (~2.5 wt %) is blended in and then it levels off at high clay concentration. However, the cell density increases nearly linearly. Exfoliated PS/MHABS nanocomposites with different compositions (0–20 wt. % MHABS) were also foamed. Similar trends in cell size and cell density were observed and more small cells were obtained compared with intercalated PS/20A nanocomposites.

Comparing the SEM images shown in FIGS. 21–24 of samples containing 0, 2.5, 5 and 7.5 wt. % of 20A, it is found that the cells tend to coalesce together when more 20A is blended in PS. This may be used to produce open cell foams that are important for adsorption, filtration, and scaffolds of tissue engineering.

Effect of Operating Conditions. PS and PS/20A intercalated nanocomposites were also foamed at different pressure drops by changing the screw rotation speed or the mass flow rate of the polmer/$CO_2$ mixture.

Figure 25:
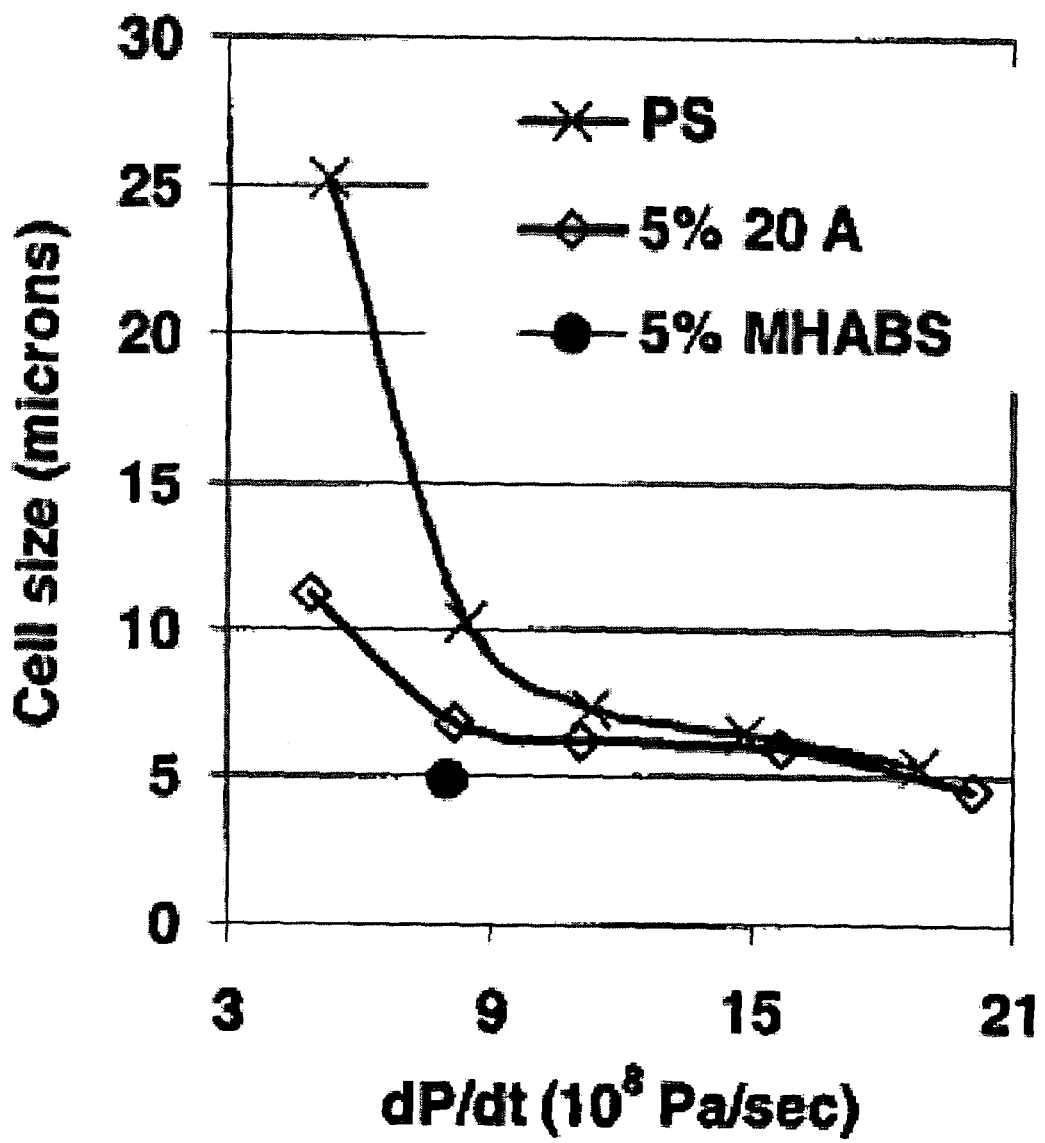
FIG. 25 shows the relationship between pressure drop rate and cell size for three different materials.
Figure 26:
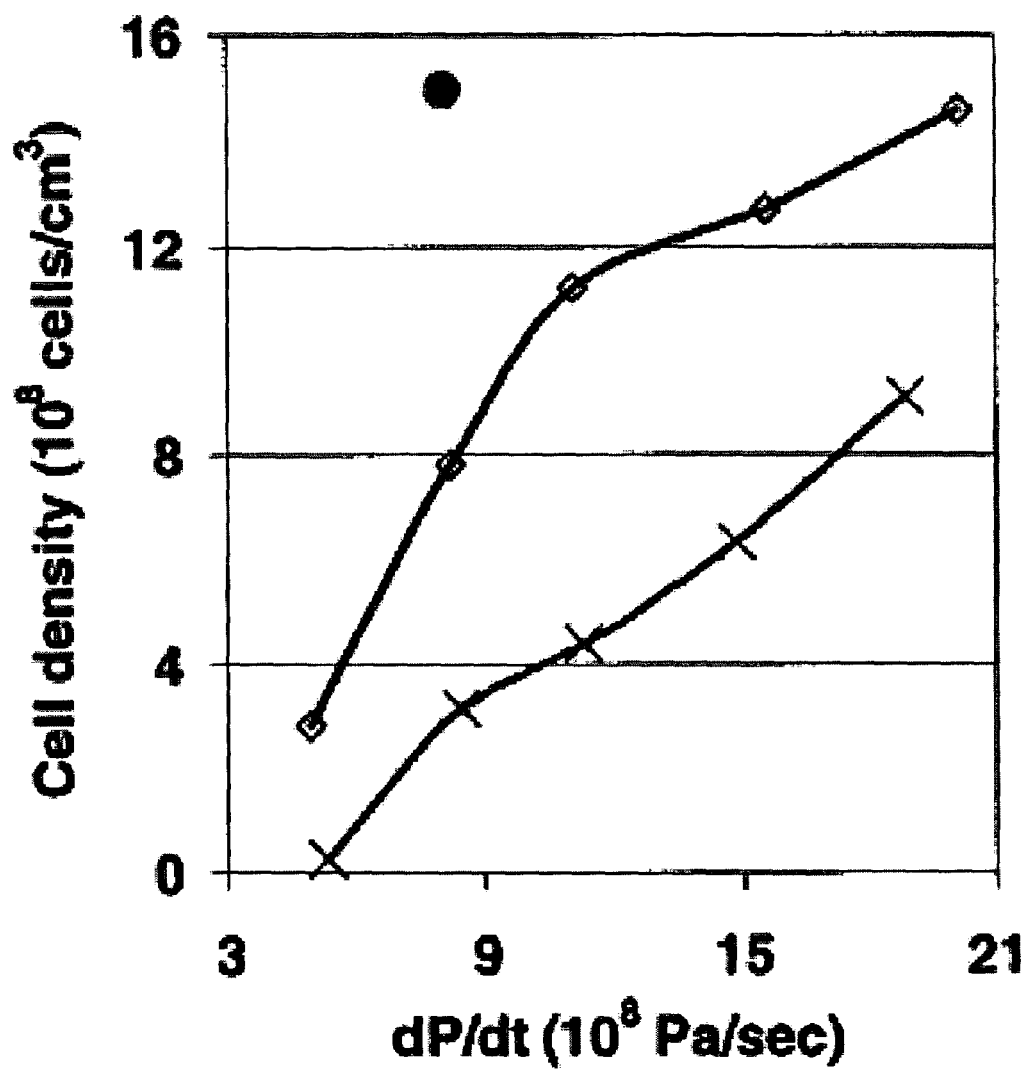
FIG. 26 shows the relationship between pressure drop rate and cell density for three different materials.

The results are summarized in FIGS. 25 and 26 that exhibit how cell size and cell density change with increasing pressure drop rate. An interesting phenomenon is that the decrease of the cell size becomes slower at high pressure drop rates, while the cell density increases linearly. Comparing with pure PS, nanocomposites make the microcellular foaming process easier, where the cell size of nanocomposites can be easily smaller than 10 μm and cell density larger than $10^9$ cells/cm³ after the pressure drop rate is greater than $10^9$ Pa/sec. The exfoliated nanocomposite provides the smallest cells and largest cell density at the lowest screw rotation speed (or the lowest pressure drop rate, $5 \times 10^8$ Pa/s).

Besides pressure, the influence of $CO_2$ concentration (0–8 wt %) and foaming die temperature (120–240° C.) was also explored. Below the $CO_2$ solubility limit, cell size decreases and cell density increases with the increase of $CO_2$ concentration. A high $CO_2$ concentration is favorable for producing open cell foams. Die temperature affects both cell size and cell structure (open or closed).

Comparing to conventional micron sized filler particles used as nucleation agents in the foaming process, the extremely fine dimensions and large surface area of nanoparticles and the intimate contact between particles and polymer matrix may greatly alter the cell nucleation and growth. It can absorb more $CO_2$ on its surface. The addition of nanoclay also increases the viscosity of the polymer matrix. This may increase the pressure drop rate in the die. The nanoclay can increase the cell density and change the cell structure (open or closed). This becomes more prominent when a polymer having low foaming ability with supercritical $CO_2$ needs to be foamed. Furthermore, the nanoclay may improve the barrier properties (low diffusion coefficient for both mass and heat), insulation properties (low heat conductivity), mechanical properties, and heat resistance, offering new opportunities in various applications.

Polystyrene/clay and PMMA/clay nanocomposites were prepared and used to make nanocomposite foams. It was found that the cell size is greatly reduced, and the cell density is increased, by adding a small amount of clay. The clay dispersion also has a great influence on the cell morphology. The exfoliated nanocomposite foam provides the highest density and lowest cell size. For exfoliated nanocomposite foams, a higher clay concentration seems mainly to improve cell density. Adding clay not only provides sites for nucleation, but also changes the Theological properties of the polymer matrix, which is also important in foaming process.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

REFERENCES

The following references are hereby incorporated by reference:
1. M. Alexandre, P. 1. M. Alexandre, P. Dubois, *Mater. Sci. Eng.*, 28, 1 (2000).
2. D. Klempner and K. C. Frisch, eds. *Handbook of Polymeric Foams and Foam Technology;* Oxford University Press: Munich; Vienna; New York (1991).
3. C. Zeng and L. J. Lee, *Macromolecules*, 34(12), 4098 (2001).
4. X. Han, C. Zeng, L. J. Lee, K. W. Koelling and D. L. Tomasko, *Annu. Tech. Conf.-Soc. Plast. Eng.*, (2002).
5. R. A. Vaia, E. Giannelis, *Marcomolecules*, 30, 7990 (1997)
6. R. A. Vaia, E. Giannelis, *Marcomolecules*, 30, 8000 (1997)
7. R. Krishnamoorti, J. Ren and A. S. Silva, *J. Chem. Phys.*, 114(11), 4968 (2001).
8. M. Okamoto, P. H. Nam, P. Maiti, T. Kotaka, N. Hasegawa and A. Usuki, *Proceeding of the First World Conference on Nanocomposites,* Chicago, Ill. (2001).
9. P. H. Nam, P. Maiti, M. Okamoto, T. Kotaka, T. Nakayama, M. Takada, M. Ohshima and A. Usuki, *Proceeding of the First World Conference on Nanocomposites,* Chicago, Ill. (2001).
10. A. I. Cooper, *J. Mater. Chem.*, 10 (2), 207 (2000).
11. C. B. Park, N. P. Suh, and D. F. Baldwin, Method for Providing Continuous Processing of Microcellular and Supermicrocellular Foamed Materials, U.S. Pat. No. 5,866,053 (1999).
12. X. Han, K. W. Koelling, D. L. Tomasko, and L. J. Lee, *Annu. Tech. Conf.-Soc. Plast. Eng.*, 58$^{th}$ (Vol. 2), 2 1857 (2000).
13. X. Han, K. W. Koelling, D. L. Tomasko, and L. J. Lee, *Annu. Tech. Conf.-Soc. Plast. Eng.*, 2 1741 (2001).
14. C. Zeng, X. Han, L. J. Lee, K. W. Koelling, and D. L. Tomasko, *Structure of Nanocomposite Foams,* unpublished.
15. L. J. Lee, K. W. Koelling, D. L. Tomasko, X. Han, and C. Zeng, *Polymer Nanocomposite Foams by Using Supercritical $CO_2$,* unpublished.
16. L. J. Lee, C. Zeng, X. Han, D. L. Tomasko, and K. W. Koelling, *Polymer Nanocomposite Foams Prepared by Supercritical Fluid Foaming Technology,* unpublished.
17. X. Han, C. Zeng, L. J. Lee, K. W. Koelling, and D. L. Tomasko, *Processing and Cell Structure of Nano-Clay Modified Microcellular Foams,* unpublished.

What is claimed is:

1. A method for forming a polymeric nanocomposite foam, said method comprising the steps of:
   providing a mixture comprising: a polymer, an organophilic clay, and a blowing agent, wherein said organophilic clay comprises:
   a smectite clay; and
   a compound having the formula:

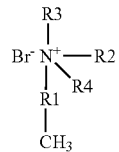

wherein R1 is $(CH)_n$ wherein n is 15, R3 is $CH_3$, R4 is a $CH_3$, and R2 is:

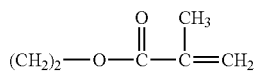

and
   processing said mixture so as to cause formation of cells, thereby forming a polymeric nanocomposite foam.

2. The method according to claim 1 wherein said mixture comprises at least 1% by weight of said blowing agent.

3. The method according to claim 1 wherein said mixture comprises at least 4% by weight of said blowing agent.

4. The method according to claim 1 wherein said mixture comprises at least 7% by weight of said blowing agent.

5. The method according to claim 1 wherein said mixture comprises at least 0.5% by weight of said organophilic clay.

6. The method according to claim 1 wherein said mixture comprises at least 5% by weight of said organophilic clay.

7. The method according to claim 1 wherein said mixture comprises at least 10% by weight of said organophilic clay.

8. The method according to claim 1 wherein said mixture comprises at least 20% by weight of said organophilic clay.

9. The method according to claim 1 wherein said organophilic clay is dispersed throughout said polymer such that a x-ray diffraction pattern produced from said mixture is substantially devoid of an intercalation peak.

10. The method according to claim 1 wherein said organophilic clay is dispersed throughout said polymer such that a x-ray diffraction pattern produced from said mixture contains an intercalation peak.

11. The method according to claim 1 wherein said smectite clay is selected from the group consisting of montmorillonite, hectorite, saponite, laponite, florohectorite, and beidellite.

12. The method according to claim 1 wherein said polymeric nanocomposite foam has an average cell size less than about 20 microns.

13. The method according to claim 1 wherein said polymeric nanocomposite foam has an average cell size greater than about 15 microns.

14. The method according to claim 1 wherein said polymeric nanocomposite foam has an average cell density greater than about $1 \times 10^6$ cells/cm$^3$.

15. The method according to claim 1 wherein said polymeric nanocomposite foam has an average cell density greater than about $1 \times 10^9$ cells/cm$^3$.

16. The method according to claim 1 wherein said polymeric nanocomposite foam is closed cell foam.

17. The method according to claim 1 wherein said polymeric nanocomposite foam is open cell foam.

18. A method for forming a polymeric nanocomposite foam, said method comprising the steps of:
providing a mixture comprising: a polymer, an organophilic clay, and a
supercritical fluid blowing agent; and
processing said mixture so as to cause formation of cells, thereby forming a polymeric nanocomposite foam.

19. The method according to claim 18 wherein said supercritical fluid blowing agent is carbon dioxide.

20. The method according to claim 18 wherein said mixture comprises at least 1% by weight of said blowing agent.

21. The method according to claim 18 wherein said mixture comprises at least 4% by weight of said blowing agent.

22. The method according to claim 18 wherein said mixture comprises at least 7% by weight of said blowing agent.

23. The method according to claim 18 wherein said mixture comprises at least 0.5% by weight of said organophilic clay.

24. The method according to claim 18 wherein said mixture comprises at least 5% by weight of said organophilic clay.

25. The method according to claim 18 wherein said mixture comprises at least 10% by weight of said organophilic clay.

26. The method according to claim 18 wherein said mixture comprises at least 20% by weight of said organophilic clay.

27. The method according to claim 18 wherein said organophilic clay is dispersed throughout said polymer such that a x-ray diffraction pattern produced from said mixture is substantially devoid of an intercalation peak.

28. The method according to claim 18 wherein said organophilic clay is dispersed throughout said polymer such that a x-ray diffraction pattern produced from said mixture contains an intercalation peak.

29. The method according to claim 18 wherein said organophilic clay comprises:
a smectite clay; and
a compound having the formula:

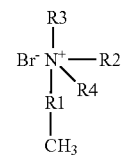

wherein:
R1 is (CH)$_n$ wherein n ranges from 6 to 20;
R2 is a chemical structure having a terminal reactive double bond;
R3 is an alkyl group; and
R4 is an alkyl group.

30. The method according to claim 29 wherein n is 15, R3 is CH$_3$, R4 is CH$_3$, and R2 is:

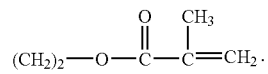

31. The method according to claim 29 wherein said smectite clay is selected from the group consisting of montmorillonite, hectorite, saponite, laponite, florohectorite, and beidellite.

32. The method according to claim 18 wherein said blowing agent is a supercritical fluid.

33. The method according to claim 18 wherein said blowing agent is supercritical carbon dioxide.

34. The method according to claim 18 wherein said polymeric nanocomposite foam has an average cell size less than about 20 microns.

35. The method according to claim 18 wherein said polymeric nanocomposite foam has an average cell size greater than about 15 microns.

36. The method according to claim 18 wherein said polymeric nanocomposite foam has an average cell density greater than about $1 \times 10^6$ cells/cm$^3$.

37. The method according to claim 18 wherein said polymeric nanocomposite foam has an average cell density greater than about $1 \times 10^9$ cells/cm$^3$.

38. The method according to claim 18 wherein said polymeric nanocomposite foam is closed cell foam.

39. The method according to claim 18 wherein said polymeric nanocomposite foam is open cell foam.

40. A method for forming a polymeric nanocomposite foam, said method comprising the steps of:
providing a mixture comprising: a polymer selected from the group consisting of polystyrene, poly(methyl methacrylate), polypropylene, nylon, polyurethane, elastomers, and mixtures thereof, an organophilic clay, and a blowing agent; and
processing said mixture so as to cause formation of cells, thereby forming a polymeric nanocomposite foam.

41. The method according to claim 40 wherein said mixture comprises at least 1% by weight of said blowing agent.

42. The method according to claim 40 wherein said mixture comprises at least 4% by weight of said blowing agent.

43. The method according to claim 40 wherein said mixture comprises at least 7% by weight of said blowing agent.

44. The method according to claim 40 wherein said mixture comprises at least 0.5% by weight of said organophilic clay.

45. The method according to claim 40 wherein said mixture comprises at least 5% by weight of said organophilic clay.

46. The method according to claim 40 wherein said mixture comprises at least 10% by weight of said organophilic clay.

47. The method according to claim 40 wherein said mixture comprises at least 20% by weight of said organophilic clay.

48. The method according to claim 40 wherein said organophilic clay is dispersed throughout said polymer such that a x-ray diffraction pattern produced from said mixture is substantially devoid of an intercalation peak.

49. The method according to claim 40 wherein said organophilic clay is dispersed throughout said polymer such that a x-ray diffraction pattern produced from said mixture contains an intercalation peak.

50. The method according to claim 40 wherein said organophilic clay comprises:
a smectite clay; and
a compound having the formula:

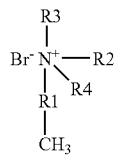

wherein:
R1 is $(CH)_n$ wherein n ranges from 6 to 20;
R2 is a chemical structure having a terminal reactive double bond;
R3 is an alkyl group; and
R4 is an alkyl group.

51. The method according to claim 50 wherein n is 15, R3 is $CH_3$, R4 is $CH_3$, and R2 is:

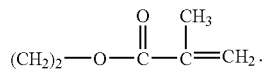

52. The method according to claim 50 wherein said smectite clay is selected from the group consisting of montmorillonite, hectorite, saponite, laponite, florohectorite, and beidellite.

53. The method according to claim 40 wherein said blowing agent is a supercritical fluid.

54. The method according to claim 40 wherein said blowing agent is supercritical carbon dioxide.

55. The method according to claim 40 wherein said polymeric nanocomposite foam has an average cell size less than about 20 microns.

56. The method according to claim 41 wherein said polymeric nanocomposite foam has an average cell size greater than about 15 microns.

57. The method according to claim 41 wherein said polymeric nanocomposite foam has an average cell density greater than about $1 \times 10^6$ cells/cm$^3$.

58. The method according to claim 40 wherein said polymeric nanocomposite foam has an average cell density greater than about $1 \times 10^9$ cells/cm$^3$.

59. The method according to claim 40 wherein said polymeric nanocomposite foam is closed cell foam.

60. The method according to claim 40 wherein said polymeric nanocomposite foam is open cell foam.

* * * * *

UNITED STATES PATENT AND TRADEMARK OFFICE
CERTIFICATE OF CORRECTION

PATENT NO. : 7,026,365 B2 Page 1 of 1
APPLICATION NO. : 10/849599
DATED : April 11, 2006
INVENTOR(S) : Lee et al.

It is certified that error appears in the above-identified patent and that said Letters Patent is hereby corrected as shown below:

Column 2,
Line 5, delete "1015 cells/cc" and insert -- $10^{15}$ cells/cc --.

Column 6,
Line 13, delete "HMKE" and insert -- HAAKE --.

Column 8,
Line 15, delete "Theological" and insert -- rheological --.

Column 9,
Line 40, delete "Theological" and insert -- rheological --.

Column 14,
Lines 27 and 30, delete "claim 41" and insert -- claim 40 --.

Signed and Sealed this

Fourth Day of July, 2006

JON W. DUDAS
*Director of the United States Patent and Trademark Office*